(12) United States Patent
Moriguchi et al.

(10) Patent No.: US 9,679,358 B2
(45) Date of Patent: Jun. 13, 2017

(54) PIXEL INTERPOLATION PROCESSING APPARATUS, IMAGING APPARATUS, INTERPOLATION PROCESSING METHOD, AND INTEGRATED CIRCUIT

(71) Applicant: MegaChips Corporation, Osaka-shi (JP)

(72) Inventors: Junji Moriguchi, Osaka (JP); Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 15/171,953

(22) Filed: Jun. 2, 2016

(65) Prior Publication Data

US 2016/0284055 A1 Sep. 29, 2016

Related U.S. Application Data

(63) Continuation of application No. PCT/JP2014/081473, filed on Nov. 27, 2014.

(30) Foreign Application Priority Data

Dec. 20, 2013 (JP) ................. 2013-264371

(51) Int. Cl.
*G06T 3/40* (2006.01)
*H04N 5/369* (2011.01)
*H04N 9/04* (2006.01)

(52) U.S. Cl.
CPC .......... *G06T 3/4015* (2013.01); *G06T 3/4007* (2013.01); *H04N 5/3696* (2013.01); *H04N 9/045* (2013.01); *H04N 2209/046* (2013.01)

(58) Field of Classification Search
None
See application file for complete search history.

(56) References Cited

U.S. PATENT DOCUMENTS

| 7,551,214 B2 | 6/2009 | Hasegawa | |
|---|---|---|---|
| 2002/0041332 A1* | 4/2002 | Murata | H04N 9/045 348/272 |

(Continued)

FOREIGN PATENT DOCUMENTS

| JP | 2006-186965 A | 7/2006 |
|---|---|---|
| JP | 2009-290607 A | 12/2009 |

(Continued)

OTHER PUBLICATIONS

U.S. Appl. No. 14/556,535, filed Dec. 1, 2014, Junji Moriguchi, et al.

(Continued)

*Primary Examiner* — Timothy J Henn
(74) *Attorney, Agent, or Firm* — Oblon, McClelland, Maier & Neustadt, L.L.P.

(57) ABSTRACT

A pixel interpolation processing apparatus and an image capturing apparatus are provided that are capable of performing a pixel interpolation process properly even when the pattern of color filter array is unknown. An imaging apparatus includes an imaging unit having a single-chip image sensor having four-color filter array for obtaining an image signal, and the imaging apparatus uses pixel data for a surrounding area around a target pixel to calculate a plurality of sets of correlation values in two directions orthogonal to each other, and determines the correlation direction based on these correlation values. The imaging apparatus obtains first to fourth color component pixel values for the target pixel relying on the fact that the high-frequency components of pixel signals in a direction orthogonal to a direction with high correlation have high correlation regardless of the color of color filters, thus allowing for performing pixel interpolation processing properly even if the four colors of color filters are unknown.

14 Claims, 22 Drawing Sheets

(56) References Cited

U.S. PATENT DOCUMENTS

| | | | |
|---|---|---|---|
| 2006/0018564 A1* | 1/2006 | Hori | G06T 3/4007 382/300 |
| 2006/0044409 A1* | 3/2006 | Aoki | H04N 9/646 348/222.1 |
| 2006/0114526 A1 | 6/2006 | Hasegawa | |
| 2007/0126885 A1* | 6/2007 | Hasegawa | G06T 3/4015 348/222.1 |
| 2007/0247530 A1* | 10/2007 | Takahasi | G06T 3/4015 348/223.1 |
| 2009/0136153 A1* | 5/2009 | Hasegawa | G06T 3/4007 382/278 |
| 2009/0167917 A1* | 7/2009 | Miki | G06T 3/4015 348/311 |
| 2009/0295950 A1 | 12/2009 | Abe | |
| 2010/0085449 A1* | 4/2010 | Nonaka | H04N 9/045 348/242 |
| 2010/0104183 A1* | 4/2010 | Hasegawa | G06T 3/4015 382/167 |
| 2011/0050918 A1 | 3/2011 | Tachi | |
| 2012/0230601 A1 | 9/2012 | Iso et al. | |
| 2012/0293696 A1* | 11/2012 | Tanaka | H04N 9/045 348/280 |
| 2013/0315506 A1* | 11/2013 | Moriya | H04N 1/3935 382/300 |
| 2015/0235382 A1* | 8/2015 | Hasegawa | G06T 7/408 345/591 |
| 2015/0237314 A1* | 8/2015 | Hasegawa | G06T 3/4007 348/279 |
| 2016/0080715 A1* | 3/2016 | Tanaka | H04N 5/3696 348/223.1 |
| 2016/0269693 A1* | 9/2016 | Moriguchi | G06T 3/4007 |

FOREIGN PATENT DOCUMENTS

| | | |
|---|---|---|
| JP | 2010-103736 A | 5/2010 |
| JP | 2011-055038 A | 3/2011 |
| JP | 2012-191465 A | 10/2012 |

OTHER PUBLICATIONS

U.S. Appl. No. 14/427,835, filed Mar. 12, 2015, Hiromu Hasegawa.
U.S. Appl. No. 14/429,909, filed Mar. 20, 2015, Hiromu Hasegawa.
U.S. Appl. No. 11/288,118, filed Nov. 29, 2005, Hiromu Hasagawa.
U.S. Appl. No. 15/161,954, filed May 23, 2016, Junji Moriguchi, et al.
International Search Report mailed Mar. 3, 2015 for PCT/JP2014/081473 filed Nov. 27, 2014 in English.
International Written Opinion mailed Mar. 3, 2015 for PCT/JP2014/081473 filed Nov. 27, 2014 with English translation.

* cited by examiner

PIXEL INTERPOLATION PROCESSING APPARATUS, IMAGING APPARATUS, INTERPOLATION PROCESSING METHOD, AND INTEGRATED CIRCUIT

TECHNICAL FIELD

The present invention relates to signal processing performed by an imaging apparatus such as a digital camera, and more particularly, to a pixel interpolation technique.

BACKGROUND ART

Image sensors, such as charge-coupled device (CCD) image sensors or complementary metal oxide semiconductor (CMOS) image sensors, incorporated in imaging apparatuses including digital cameras convert light received through a color filter to electrical signals by photoelectric conversion, and output the electrical signals as pixel signals. Such color filters include a RGB color filter, on which red, green, and blue patterns are formed, or a YMCK color filter, on which yellow, magenta, cyan, and black patterns are formed. A single-chip image sensor outputs a pixel signal of one color for one pixel. When using the RGB color filter, the image sensor outputs a pixel signal representing one of red (R), green (G), and blue (B) color components for one pixel.

Each pixel signal output from the single-chip color image sensor needs interpolation to generate pixel signals representing the other color components. Such interpolation may be performed using various algorithms. For example, one interpolation method calculates the degree of correlation in the horizontal direction and the degree of correlation in the vertical direction, and uses a pixel located in the direction with a higher correlation to perform pixel interpolation. Another interpolation method may perform weighting in accordance with the distance between a target pixel and its neighboring pixel before such pixel interpolation.

A technique described in Patent Literature 1 (Patent Literature 1: Japanese Unexamined Patent Publication No 2006-186965) differentiates a gray area and a color area in an image obtained by an image sensor with a Bayer array (RGB color filter), and performs pixel interpolation in accordance with the characteristics of the image areas. In particular, the technique in Patent Literature 1 reduces false colors in an area of boundary between a gray area and a color area. For the area of boundary between the gray area and the color area, the technique in Patent Literature 1 determines the direction of correlation with a method intended for a grayscale image area, and performs pixel interpolation with an interpolation method intended for a color image area, thus reducing false colors caused by pixel interpolation.

DISCLOSURE OF INVENTION

Technical Problem

An imaging apparatus may include a four-color filter, such as a Ye-Cy-G-Mg array (Yellow-Cyan-Green-Magenta array) and a RGBYe array (Red-Green-Blue-Yellow array). An imaging apparatus including a single-chip image sensor with such a four-color filter outputs a pixel signal representing one of the four color components for one pixel.

The technique described in Patent Literature 1 is assumed to be used for an image sensor with a Bayer array (RGB color filter); that is, it is assumed to be used for an image sensor with a color filter whose array pattern (information of colors that a color filter includes) is known. Thus, in a case when the array pattern of a color filter (information of colors that a color filter includes) is unknown, the technique described in Patent Literature 1 is not directly applicable to an image sensor with a color filter whose array pattern is unknown. Moreover, it is difficult to adequately perform pixel interpolation in a case when the array pattern of a color filter (information of colors that a color filter includes) is unknown.

In view of the above problems, it is an object of the present invention to provide a pixel interpolation apparatus, an imaging apparatus, a program, and an integrated circuit that appropriately perform pixel interpolation in a case when the array pattern of a color filter (information of colors that a color filter includes) is unknown.

Solution to Problem

To solve the above problem, a first aspect of the invention provides a pixel interpolation processing apparatus for performing pixel interpolation processing on an image obtained by an imaging unit having a four-color filter array in which, in an odd-numbered row, first-color component filters and second-color component filters are arranged alternately with a first-color component filter leading the row, and, in an even-numbered row, third-color component filters and fourth-color component filters are arranged alternately with a third-color component filter leading the row. The pixel interpolation processing apparatus includes a correlation value calculation unit, a correlation direction determination unit, and an interpolation unit.

The correlation value calculation unit uses pixel data for a surrounding area around a target pixel to obtain a plurality of sets of correlation values in two directions orthogonal to each other in the image.

The correlation direction determination unit determines a correlation direction in the surrounding area around the target pixel based on the correlation values obtained by the correlation value calculation unit.

The interpolation unit performs the pixel interpolation processing on the target pixel based on the correlation direction determined by the correlation direction determination unit.

When it is determined, based on the correlation values, that there is a direction with a high correlation, the interpolation unit performs the processing (1) to (3) described below.

(1) If a color component value for the same color as that of a pixel located adjacent to the target pixel in the correlation direction is to be calculated, the interpolation unit selects a plurality of pixels that include the target pixel, have the same color, and are arranged in the correlation direction, and calculates a color component value for the same color as that of a pixel located adjacent to the target pixel in the correlation direction based on (i) pixel values of two pixels located adjacent to and sandwiching the target pixel in the correlation direction and (ii) a ratio of change in the correlation direction calculated using pixel values of the plurality of pixels that the interpolation unit has selected.

(2) If a color component value for the same color as that of a pixel located adjacent to the target pixel in a normal direction which is a direction orthogonal to the correlation direction is to be calculated, the interpolation unit selects a plurality of pixels that have the same color and are arranged in the normal direction and calculates a color component value for the same color as that of a pixel located adjacent to the target pixel in the normal direction based on a ratio of change in the normal direction calculated using pixel values of two pixels included in the plurality of pixels that the interpolation unit has selected. The two pixels sandwich the target pixel.

(3) If a color component value for a first calculation target color which is a color component value having the same color as that of a pixel located adjacent to the target pixel in a direction inclined relative to the correlation direction is to be calculated, (3A) the interpolation unit selects a plurality of pixels with the same color from a first group of pixels which are a plurality of pixels including a first adjacent pixel that is one of pixels that are located adjacent to the target pixel in the normal direction and are arranged in the correlation direction, calculates a ratio of change in the normal direction from pixel values of the selected pixels, selects, from the first group of pixels, a pixel with the same color as the first calculation target color, and calculates a color component value for the first calculation target color of the first adjacent pixel based on the selected pixel and the calculated ratio of change in the normal direction, (3B) the interpolation unit selects a plurality of pixels with the same color from a second group of pixels which are a plurality of pixels including a second adjacent pixel that is another one of the pixels that are located adjacent to the target pixel in the normal direction and are arranged in the correlation direction, calculates a ratio of change in the normal direction from pixel values of the selected pixels, selects, from the second group of pixels, a pixel with the same color as the first calculation target color, and calculates a color component value for the first calculation target color of the second adjacent pixel based on the selected pixel and the calculated ratio of change in the normal direction, and (3C) the interpolation unit selects a plurality of pixels that have the same color and are arranged in the normal direction, calculates a ratio of change in the normal direction from pixel values of the selected pixels, and calculates a color component value for the first calculation target color of the target pixel based on (i) the calculated ratio of change in the normal direction, (ii) the calculated color component value for the first calculation target color of the first adjacent pixel, and (iii) the calculated color component value for the first calculation target color of the second adjacent pixel.

The pixel interpolation processing apparatus appropriately performs pixel interpolation processing even in a case when the array pattern of a color filter (information of colors that a color filter includes) is unknown.

In other words, the pixel interpolation processing apparatus obtains the first-color to fourth-color component values in consideration of the fact that high-frequency components of a pixel signal in the direction (normal direction to a correlation direction) orthogonal to a direction having high correlation (correlation direction) have high correlation (are similar) regardless of colors of color filters. Thus, the pixel interpolation processing apparatus appropriately performs pixel interpolation processing even in a case when the four-color array pattern of a color filter (the array pattern of the first-color to fourth-color) is unknown. Furthermore, the pixel interpolation processing apparatus obtains a ratio of change (e.g., Laplacian components) using the same color pixel in consideration of the array pattern of a color filter, and then estimates a specific color component value of a pixel located at a predetermined position using the obtained ratio of change (e.g., Laplacian components). Thus, the pixel interpolation processing apparatus appropriately estimates (obtains) the specific color component value of the pixel located at the predetermined position even in a case when the array pattern of a color filter (information of colors that a color filter includes) is unknown.

In other words, the pixel interpolation processing apparatus uses the specific color component value of the pixel located at the predetermined position, which is obtained based on the ratio of change (e.g., Laplacian components). Furthermore, the pixel interpolation processing apparatus performs pixel interpolation processing in consideration of the fact that high-frequency components of a pixel signal in the direction (normal direction to a correlation direction) orthogonal to a direction having high correlation (correlation direction) have high correlation (are similar) regardless of colors of color filters. This achieves remarkably high accurate pixel interpolation processing as compared with the conventional techniques.

The pixel interpolation processing apparatus does not need information of the array pattern of the color filter (information of colors that a color filter includes), thus eliminating the need for pixel interpolation processing in which different processing is performed depending on a color that the target pixel has, which conventional techniques require. Accordingly, the pixel interpolation processing apparatus achieves highly accurate pixel interpolation processing with less arithmetic processing.

A second aspect of the invention provides the pixel interpolation processing apparatus of the first aspect of the invention in which the surrounding area around the target pixel is a pixel area of five by five pixels, in which a pixel P22 is centered, the pixel P22 representing the target pixel, the pixel area including a first row composed of five pixels P00 to P04, a second row composed of five pixels P10 to P14, a third row composed of five pixels P20 to P24, a fourth row composed of five pixels P30 to P34, and a fifth row composed of five pixels P40 to P44.

This allows for performing the pixel interpolation processing using the pixel area of five by five pixels.

A third aspect of the invention provides the pixel interpolation processing apparatus of the second aspect of the invention in which if the correlation direction is a horizontal direction, the interpolation unit performs the processing (1) to (3) described below.

(1) When a color component value D2out for the same color as that of a pixel located adjacent to the target pixel in the correlation direction is to be calculated, the interpolation unit calculates the color component value D2out by a process represented by:

$$D2out=(P21+P23)/2-(P20-2\times P22+P24)\times gain0,$$

where gain0 is a coefficient for adjustment,
where Pxy is a pixel value of the pixel Pxy.

(2) When a color component value D3out for the same color as that of a pixel located adjacent to the target pixel in a normal direction which is a direction orthogonal to the correlation direction is to be calculated, the interpolation unit calculates the color component value D3out by a process represented by:

$$q0=(P11+P31)/2-(P01-2\times P21+P41)\times gain1,$$

$$q1=(P13+P33)/2-(P03-2\times P23+P43)\times gain2,$$

$$d0a=P11-q0,$$

$$d0b=P13-q1,$$

$$d0=(d0a+d0b)/2,$$

$$d1a=P31-q0,$$

$$d1b = P33 - q1,$$

$$d1 = (d1a + d1b)/2, \text{ and}$$

$$D3\text{out} = (P12 + P32)/2 - (d0 + d1) \times \text{gain3},$$

where gain1, gain2 and gain3 are coefficients for adjustment, where Pxy is a pixel value of the pixel Pxy.

(3) When a color component value D4out of the first calculation target color which is a color component value for the same color as that of a pixel located adjacent to the target pixel in a direction inclined relative to the correlation direction is to be calculated, the interpolation unit calculates the color component value D4out by a process represented by:

$$q0 = (P11 + P31)/2 - (P01 - 2 \times P21 + P41) \times \text{gain1},$$

$$q1 = (P13 + P33)/2 - (P03 - 2 \times P23 + P43) \times \text{gain2},$$

$$d0a = P11 - q0,$$

$$d0b = P13 - q1,$$

$$d0 = (d0a + d0b)/2,$$

$$d1a = P31 - q0,$$

$$d1b = P33 - q1,$$

$$d1 = (d1a + d1b)/2,$$

$$r0 = (P11 + P13)/2 - (P10 - 2 \times P12 + P14) \times \text{gain4},$$

$$r1 = (P31 + P33)/2 - (P30 - 2 \times P32 + P34) \times \text{gain5}, \text{ and}$$

$$D4\text{out} = (r0 + r1)/2 - (d0 + d1) \times \text{gain6},$$

where gain1, gain2 and gain3 are coefficients for adjustment, where gain4, gain5 and gain6 are coefficients for adjustment.

This achieves highly accurate pixel interpolation processing when the correlation direction is the horizontal direction.

A fourth aspect of the invention provides the pixel interpolation processing apparatus of the second aspect of the invention in which if the correlation direction is a vertical direction, the interpolation unit performs the processing (1) to (3) described below.

(1) When a color component value D3out for the same color as that of a pixel located adjacent to the target pixel in the correlation direction is to be calculated, the interpolation unit calculates the color component value D3out by a process represented by:

$$t0 = (P12 + P32)/2,$$

$$t1 = (P02 - 2 \times P22 + P42) \times \text{gain10}, \text{ and}$$

$$D3\text{out} = t0 - t1,$$

where gain10 is a coefficient for adjustment, where Pxy is a pixel value of the pixel Pxy.

(2) When a color component value D2out for the same color as that of a pixel located adjacent to the target pixel in a normal direction which is a direction orthogonal to the correlation direction is to be calculated, the interpolation unit calculates the color component value D2out by a process represented by:

$$q0 = (P11 + P13)/2 - (P10 - 2 \times P12 + P14) \times \text{gain11},$$

$$q1 = (P31 + P33)/2 - (P30 - 2 \times P32 + P34) \times \text{gain12},$$

$$d0a = P11 - q0,$$

$$d0b = P31 - q1,$$

$$d0 = (d0a + d0b)/2,$$

$$d1a = P13 - q0,$$

$$d1b = P33 - q1,$$

$$d1 = (d1a + d1b)/2, \text{ and}$$

$$D2\text{out} = (P21 + P23)/2 - (d0 + d1) \times \text{gain13}$$

where gain11, gain12 and gain13 are coefficients for adjustment, where Pxy is a pixel value of the pixel Pxy.

(3) When a color component value D4out for the first calculation target color which is a color component value for the same color as that of a pixel located adjacent to the target pixel in a direction inclined relative to the correlation direction is to be calculated, the interpolation unit calculates the color component value D4out by a process represented by:

$$q0 = (P11 + P13)/2 - (P10 - 2 \times P12 + P14) \times \text{gain11},$$

$$q1 = (P31 + P33)/2 - (P30 - 2 \times P32 + P34) \times \text{gain12},$$

$$d0a = P11 - q0,$$

$$d0b = P31 - q1,$$

$$d0 = (d0a + d0b)/2,$$

$$d1a = P13 - q0,$$

$$d1b = P33 - q1,$$

$$d1 = (d1a + d1b)/2,$$

$$r0 = (P11 + P31)/2 - (P01 - 2 \times P21 + P41) \times \text{gain14},$$

$$r1 = (P13 + P33)/2 - (P03 - 2 \times P23 + P43) \times \text{gain15}, \text{ and}$$

$$D4\text{out} = (r0 + r1)/2 - (d0 + d1) \times \text{gain16},$$

where gain11, gain12, gain14 and gain15 are coefficients for adjustment.

This achieves highly accurate pixel interpolation processing when the correlation direction is the vertical direction.

A fifth aspect of the invention provides the pixel interpolation processing apparatus of the second aspect of the invention in which if the correlation direction is a first diagonal direction that is a left obliquely upward direction, the interpolation unit performs the processing (1) to (3) described below.

(1) When a color component value D4out for the same color as that of a pixel located adjacent to the target pixel in the correlation direction is to be calculated, the interpolation unit calculates the color component value D4out by a process represented by:

$$D4\text{out} = (P11 + P33)/2 - (P00 - 2 \times P22 + P44) \times \text{gain40},$$

where gain40 is a coefficient for adjustment, where Pxy is a pixel value of the pixel Pxy.

(2) When a color component value D3out for the same color as that of a pixel located adjacent to the target pixel in a vertical direction is to be calculated, the interpolation unit calculates the color component value D3out by a process represented by:

$$s0=(P02+P24)/2,$$

$$s=P22,$$

$$s1=(P20+P42)/2,$$

$$q0=(3{\times}P12+P34)/4,$$

$$q1=(P10+3{\times}P32)/4, \text{ and}$$

$$D3\text{out}=(q0+q1)/2-(s0-2{\times}s+s1){\times}\text{gain41},$$

where gain41 is a coefficient for adjustment,
where Pxy is a pixel value of the pixel Pxy.

(3) When a color component value D2out for the same color as that of a pixel located adjacent to the target pixel in a horizontal direction is to be calculated, the interpolation unit calculates the color component value D2out by a process represented by:

$$s0=(P02+P24)/2,$$

$$s=P22,$$

$$s1=(P20+P42)/2,$$

$$q0=(P01+3{\times}P23)/4,$$

$$q1=(3{\times}P21+P43)/4, \text{ and}$$

$$D2\text{out}=(q0+q1)/2-(s0-2{\times}s+s1){\times}\text{gain42},$$

where gain42 is a coefficient for adjustment.

This achieves highly accurate pixel interpolation processing when the correlation direction is the first diagonal direction.

A sixth aspect of the invention provides the pixel interpolation apparatus of the second aspect of the invention in which if the correlation direction is a second diagonal direction that is a right obliquely upward direction, the interpolation unit performs the processing (1) to (3) described below.

(1) When a color component value D4out for the same color as that of a pixel located adjacent to the target pixel in the correlation direction is to be calculated, the interpolation unit calculates the color component value D4out by a process represented by:

$$D4\text{out}=(P13+P31)/2-(P04-2{\times}P22+P40){\times}\text{gain50},$$

where gain50 is a coefficient for adjustment,
where Pxy is a pixel value of the pixel Pxy.

(2) When a color component value D3out for the same color as that of a pixel located adjacent to the target pixel in a vertical direction is to be calculated, the interpolation unit calculates the color component value D3out by a process represented by:

$$s0=(P02+P20)/2,$$

$$s=P22,$$

$$s1=(P24+P42)/2,$$

$$q0=(3{\times}P12+P30)/4,$$

$$q1=(P14+3{\times}P32)/4, \text{ and}$$

$$D3\text{out}=(q0+q1)/2-(s0-2{\times}s+s1){\times}\text{gain51},$$

where gain51 is a coefficient for adjustment,
where Pxy is a pixel value of the pixel Pxy.

(3) When a color component value D2out for the same color as that of a pixel located adjacent to the target pixel in a horizontal direction is to be calculated, the interpolation unit calculates the color component value D2out by a process represented by:

$$s0=(P02+P20)/2,$$

$$s=P22,$$

$$s1=(P24+P42)/2,$$

$$q0=(P03+3{\times}P21)/4,$$

$$q1=(3{\times}P23+P41)/4, \text{ and}$$

$$D2\text{out}=(q0+q1)/2-(s0-2{\times}s+s1){\times}\text{gain52},$$

where gain52 is a coefficient for adjustment.

This achieves highly accurate pixel interpolation processing when the correlation direction is the second diagonal direction.

A seventh aspect to a twelfth aspect of the invention each provide an imaging apparatus including a imaging unit and the pixel interpolation processing apparatus according to one of the first to sixth aspects of the invention, respectively.

The imaging unit has a four-color filter array in which, in an odd-numbered row, first color component filters and second color component filters are arranged alternately with a first color component filter leading the row, and, in an even-numbered row, third color component filters and fourth color component filters are arranged alternately with a third color component filter leading the row, the imaging unit configured to obtain an image signal from light from a subject.

The pixel interpolation processing apparatus according to one of the first to sixth aspects of the invention performs pixel interpolation processing on an image signal.

This achieves the imaging apparatus including the pixel interpolation processing apparatus according to one of the first to sixth aspects of the invention.

A thirteenth aspect of the invention provides a pixel interpolation processing method for performing pixel interpolation processing on an image obtained by an imaging unit having a four-color filter array in which, in an odd-numbered row, first-color component filters and second-color component filters are arranged alternately with a first-color component filter leading the row, and, in an even-numbered row, third-color component filters and fourth-color component filters are arranged alternately with a third-color component filter leading the row.

The pixel interpolation processing method includes a correlation value calculation step, a correlation direction determination step, and an interpolation step.

The correlation value calculation step uses pixel data for a surrounding area around a target pixel to obtain a plurality of sets of correlation values in two directions orthogonal to each other in the image.

The correlation direction determination step determines a correlation direction in the surrounding area around the target pixel based on the correlation values obtained by the correlation value calculation step.

The interpolation step performs the pixel interpolation processing on the target pixel based on the correlation direction determined by the correlation direction determination step.

When it is determined, based on the correlation values, that there is a direction with a high correlation, the interpolation step performs the processing (1) to (3) described below.

(1) If a color component value for the same color as that of a pixel located adjacent to the target pixel in the correlation direction is to be calculated, the interpolation step selects a plurality of pixels that include the target pixel, have the same color, and are arranged in the correlation direction, and calculates a color component value for the same color as that of a pixel located adjacent to the target pixel in the correlation direction based on (i) pixel values of two pixels located adjacent to and sandwiching the target pixel in the correlation direction and (ii) a ratio of change in the correlation direction calculated using pixel values of the plurality of pixels that the interpolation step has selected.

(2) If a color component value for the same color as that of a pixel located adjacent to the target pixel in a normal direction which is a direction orthogonal to the correlation direction is to be calculated, the interpolation step selects a plurality of pixels that have the same color and are arranged in the normal direction and calculates a color component value for the same color as that of a pixel located adjacent to the target pixel in the normal direction based on a ratio of change in the normal direction calculated using pixel values of two pixels included in the plurality of pixels that the interpolation step has selected. The two pixels sandwich the target pixel.

(3) If a color component value for a first calculation target color which is a color component value having the same color as that of a pixel located adjacent to the target pixel in a direction inclined relative to the correlation direction is to be calculated, (3A) the interpolation step selects a plurality of pixels with the same color from a first group of pixels which are a plurality of pixels including a first adjacent pixel that is one of pixels that are located adjacent to the target pixel in the normal direction and are arranged in the correlation direction, calculates a ratio of change in the normal direction from pixel values of the selected pixels, selects, from the first group of pixels, a pixel with the same color as the first calculation target color, and calculates a color component value for the first calculation target color of the first adjacent pixel based on the selected pixel and the calculated ratio of change in the normal direction, (3B) the interpolation step selects a plurality of pixels with the same color from a second group of pixels which are a plurality of pixels including a second adjacent pixel that is another one of the pixels that are located adjacent to the target pixel in the normal direction and are arranged in the correlation direction, calculates a ratio of change in the normal direction from pixel values of the selected pixels, selects, from the second group of pixels, a pixel with the same color as the first calculation target color, and calculates a color component value for the first calculation target color of the second adjacent pixel based on the selected pixel and the calculated ratio of change in the normal direction, and (3C) the interpolation step selects a plurality of pixels that have the same color and are arranged in the normal direction, calculates a ratio of change in the normal direction from pixel values of the selected pixels, and calculates a color component value for the first calculation target color of the target pixel based on (i) the calculated ratio of change in the normal direction, (ii) the calculated color component value for the first calculation target color of the first adjacent pixel, and (iii) the calculated color component value for the first calculation target color of the second adjacent pixel.

This achieves the program having the same advantageous effects as the pixel interpolation processing apparatus of the first aspect of the present invention.

A fourteenth aspect of the invention provides an integrated circuit for performing pixel interpolation processing on an image obtained by an imaging unit having a four-color filter array in which, in an odd-numbered row, first-color component filters and second-color component filters are arranged alternately with a first-color component filter leading the row, and, in an even-numbered row, third-color component filters and fourth-color component filters are arranged alternately with a third-color component filter leading the row. The integrated circuit includes a correlation value calculation unit, a correlation direction determination unit, and an interpolation unit.

The correlation value calculation unit uses pixel data for a surrounding area around a target pixel to obtain a plurality of sets of correlation values in two directions orthogonal to each other in the image.

The correlation direction determination unit determines a correlation direction in the surrounding area around the target pixel based on the correlation values obtained by the correlation value calculation unit.

The interpolation unit performs the pixel interpolation processing on the target pixel based on the correlation direction determined by the correlation direction determination unit.

When it is determined, based on the correlation values, that there is a direction with a high correlation, the interpolation unit performs the processing (1) to (3) described below.

(1) If a color component value for the same color as that of a pixel located adjacent to the target pixel in the correlation direction is to be calculated, the interpolation unit selects a plurality of pixels that include the target pixel, have the same color, and are arranged in the correlation direction, and calculates a color component value for the same color as that of a pixel located adjacent to the target pixel in the correlation direction based on (i) pixel values of two pixels located adjacent to and sandwiching the target pixel in the correlation direction and (ii) a ratio of change in the correlation direction calculated using pixel values of the plurality of pixels that the interpolation unit has selected.

(2) If a color component value for the same color as that of a pixel located adjacent to the target pixel in a normal direction which is a direction orthogonal to the correlation direction is to be calculated, the interpolation unit selects a plurality of pixels that have the same color and are arranged in the normal direction and calculates a color component value for the same color as that of a pixel located adjacent to the target pixel in the normal direction based on a ratio of change in the normal direction calculated using pixel values of two pixels included in the plurality of pixels that the interpolation unit has selected. The two pixels sandwich the target pixel.

(3) If a color component value for a first calculation target color which is a color component value having the same color as that of a pixel located adjacent to the target pixel in a direction inclined relative to the correlation direction is to be calculated, (3A) the interpolation unit selects a plurality of pixels with the same color from a first group of pixels which are a plurality of pixels including a first adjacent pixel that is one of pixels that are located adjacent to the target pixel in the normal direction and are arranged in the correlation direction, calculates a ratio of change in the normal direction from pixel values of the selected pixels, selects, from the first group of pixels, a pixel with the same color as the first calculation target color, and calculates a color component value for the first calculation target color of the first adjacent pixel based on the selected pixel and the calculated ratio of change in the normal direction, (3B) the interpolation unit selects a plurality of pixels with the same color from a second group of pixels which are a plurality of pixels including a second adjacent pixel that is another one of the pixels that are located adjacent to the target pixel in the normal direction and are arranged in the correlation direction, calculates a ratio of change in the normal direction from pixel values of the selected pixels, selects, from the second group of pixels, a pixel with the same color as the first calculation target color, and calculates a color component value for the first calculation target color of the second adjacent pixel based on the selected pixel and the calculated ratio of change in the normal direction, and (3C) the interpolation unit selects a plurality of pixels that have the same color and are arranged in the normal direction, calculates a ratio of change in the normal direction from pixel values of the selected pixels, and calculates a color component value for the first calculation target color of the target pixel based on (i) the calculated ratio of change in the normal direction, (ii) the calculated color component value for the first calculation target color of the first adjacent pixel, and (iii) the calculated color component value for the first calculation target color of the second adjacent pixel.

This achieves the integrated circuit having the same advantageous effects as the pixel interpolation processing apparatus of the first aspect of the present invention.

Advantageous Effects

The present invention provides a pixel interpolation processing apparatus, an imaging apparatus, a program, and an integrated circuit that appropriately perform pixel interpolation in a case when the array pattern of a color filter (information of colors that a color filter includes) is unknown.

EMBODIMENTS OF THE INVENTION

First Embodiment

Figure 1:
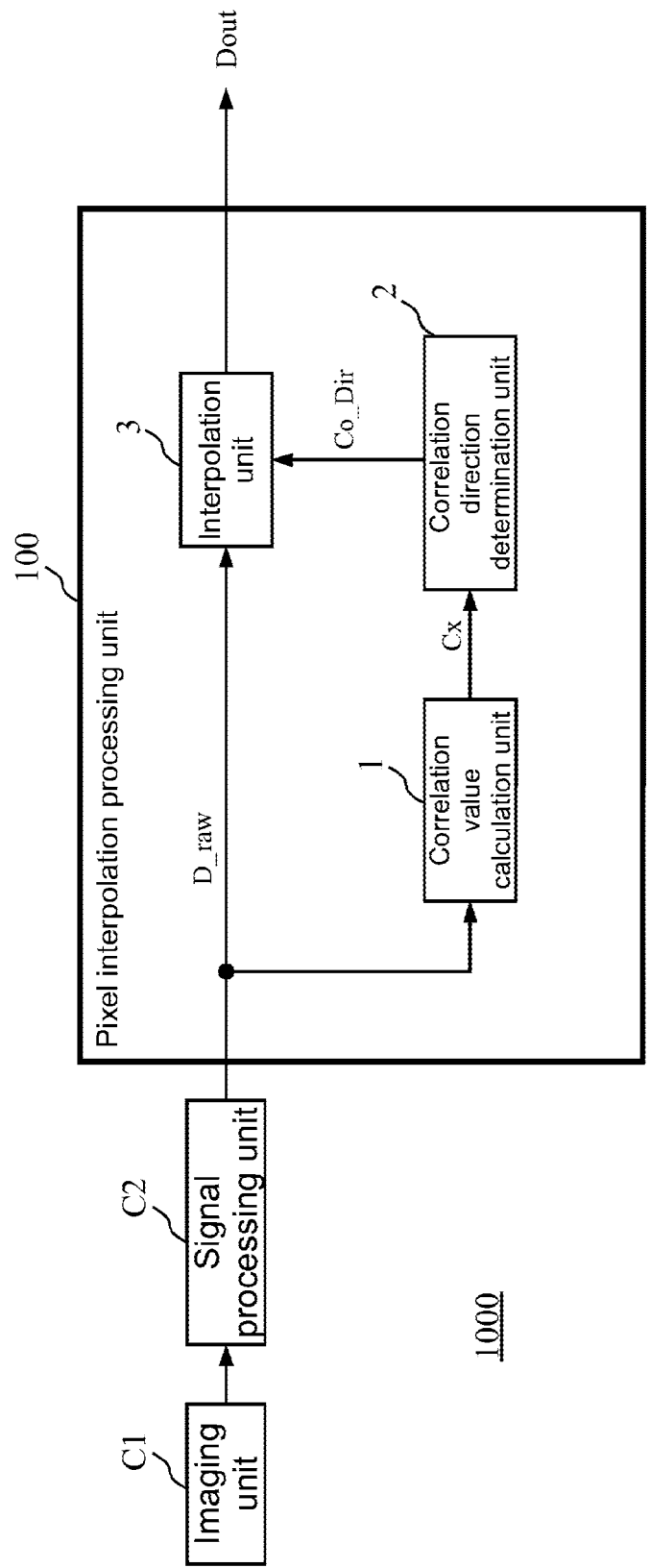
FIG. 1 is a schematic diagram of an imaging apparatus 1000 according to a first embodiment.

A first embodiment will now be described with reference to the drawings 1.1 Structure of Imaging Apparatus FIG. 1 is a schematic diagram of an imaging apparatus 1000 according to the first embodiment.

As shown in FIG. 1, the imaging apparatus 1000 includes an imaging unit C1, a signal processing unit C2, and a pixel interpolation processing unit 100. The imaging unit C1 converts light from a subject through photoelectric conversion to obtain image signals. The signal processing unit C2 performs predetermined signal processing on the image signals obtained by the imaging unit C1. The pixel interpolation processing unit 100 (pixel interpolation apparatus) performs pixel interpolation processing on the image signals that have undergone the predetermined signal processing performed by the signal processing unit C2.

The imaging unit C1 includes an optical system, a four-color array filter, and an image sensor.

For ease of explanation, a case in which "a four-color array filter" includes a first-color component filter, a second-color component filter, a third-color component filter, and a fourth-color component filter. Their array pattern is follows.
(1) In a first row, first-color component filters and second-color component filters are arranged alternately in the order of the first-color component filter, the second-color component filter, the first-color component filter, the second-color component filter, . . . .
(2) In a second row the third-color component filters and the fourth-color component filters are arranged alternately in the order of the third-color component filter, the fourth-color component filter, the third-color component filter, the fourth-color component filter, . . . .

In other words, "a four-color array filter" includes odd-numbered rows in which first-color component filters and second-color component filters are arranged alternately, and even-numbered rows in which third-color component filters and fourth-color component filters are arranged alternately. A case in which "a four-color array filter" is arranged in such an array will be described below.

The optical system, including one or more lenses, collects light from a subject, and focuses the subject light onto the surface of the image sensor. The optical system may be capable of exposure adjustment and focus adjustment.

The four-color array filter includes four color component filters, which are a first-color component pixel filter, a second-color component pixel filter, a third-color component pixel filter, and a fourth-color component pixel filter; it is arranged as described above. The four-color array filter is arranged on the imaging surface of the image sensor.

The image sensor has a plurality of pixels. The image sensor converts subject light, which has been collected by the optical system and focused onto the imaging surface through the four-color array filter, by photoelectric conversion to generate image signals (electrical signals). The image sensor generates a first-color component pixel signal through a pixel for obtaining a first-color component, and generates a second-color component pixel signal through a pixel for obtaining a second-color component. The image sensor generates a third-color component pixel signal through a pixel for obtaining a third-color component, and generates a fourth-color component pixel signal through a pixel for obtaining a fourth-color component. The image sensor outputs the pixel signals generated through those pixels (the first-color component pixel signal, the second-color component pixel signal, the third-color component pixel signal, and the fourth-color component pixel signal) to the signal processing unit C2 as image signals.

The signal processing unit C2 receives the image signals output from the imaging unit C1, and subjects the input image signals to predetermined signal processing (eg, gain adjustment, white balance adjustment, and gamma correction). The signal processing unit C2 outputs the image signals that have undergone the predetermined signal processing to the pixel interpolation processing unit 100 as an image signal D_raw.

As shown in FIG. 1, the pixel interpolation processing unit 100 includes a correlation value calculation unit 1, a correlation direction determination unit 2, and interpolation unit 3.

The correlation value calculation unit 1 receives the image signal D_raw output from the signal processing unit C2 (a single image, or a one-frame image formed using the image signal D_raw, hereafter expressed as an image D_raw). The correlation value calculation unit 1 calculates the following four color correlation values for a target pixel (a pixel to be processed) in the image D_raw (Details thereof will be described later).
(A1) a vertical direction correlation value Cv
(A2) a horizontal direction correlation value Ch
(A3) a first diagonal direction correlation value Cd1
(A4) a second diagonal direction correlation value Cd2

The correlation value calculation unit 1 outputs the four correlation values calculated for each pixel in the image D_raw to the correlation direction determination unit 2. Note that the above-described four correlation values are collectively referred to Cx.

The correlation direction determination unit 2 receives the correlation value Cx for each pixel output from the correlation value calculation unit 1. The correlation direction determination unit 2 determines a correlation direction for each pixel based on the correlation value Cx (described in detail later). The correlation direction determination unit 2 outputs information Co_Dir about the correlation direction for each pixel to the interpolation unit 3.

The interpolation unit 3 receives the image signal D_raw output from the signal processing unit C2 and the information Co_Dir about the correlation direction for each pixel output from the correlation direction determination unit 2. The interpolation unit 3 performs pixel interpolation processing for each pixel in the image D_raw to allow each of all the pixels to have the first-color component, the second-color component, the third-color component, and the fourth-color component, based on the correlation direction determined by the correlation direction determination unit 2 (described in detail later). The interpolation unit 3 outputs image signals resulting from the pixel interpolation processing (image signals in which each of all the pixels included in an image formed by the image signals has the first-component, the second-component, the third-component, and the fourth-component), as an image signal Dout.

1.2 Operation of Imaging Apparatus

The imaging apparatus 1000 with the above structure will now be described.

Figure 2:
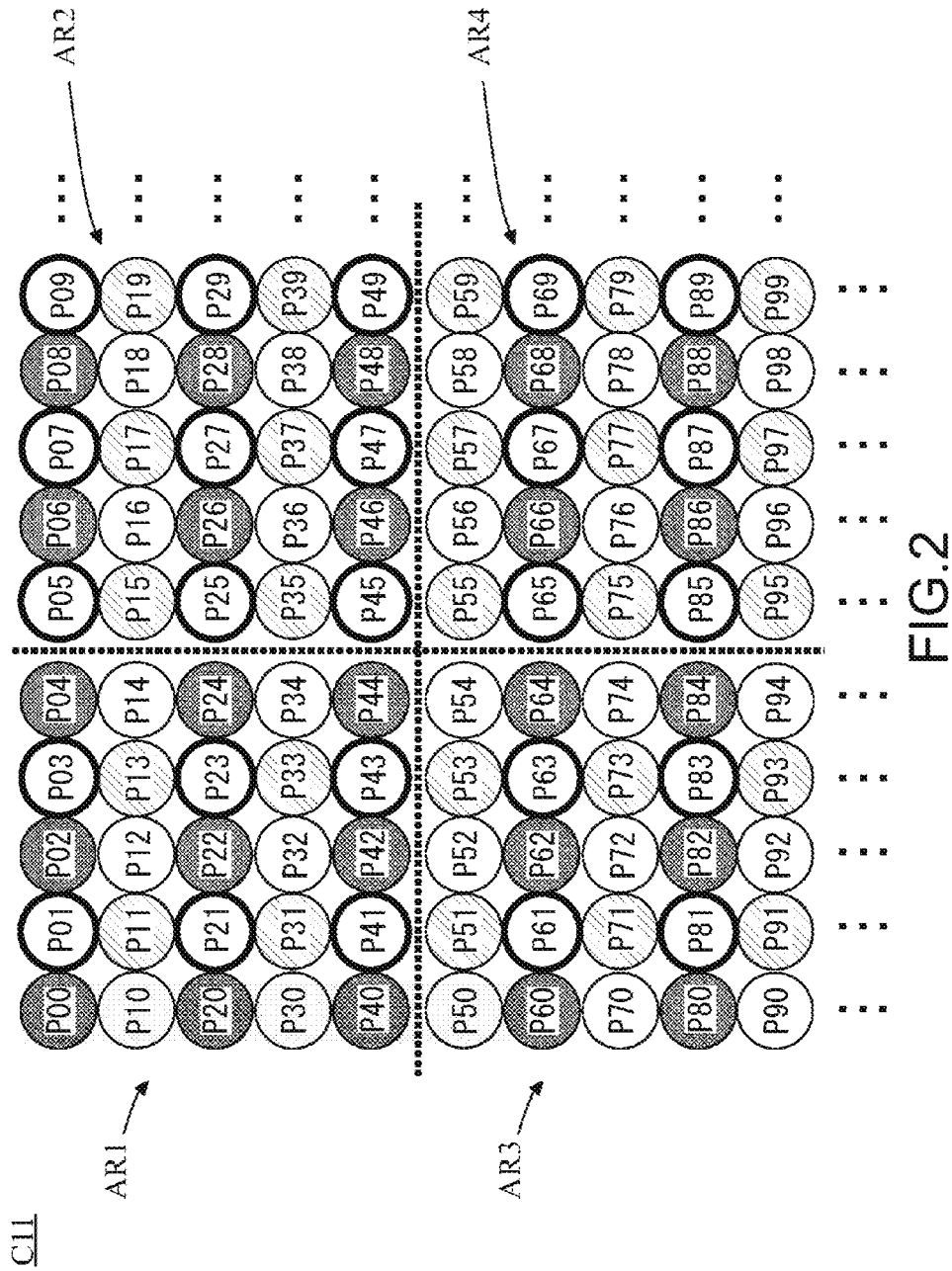
FIG. 2 is a diagram showing an example of the array pattern formed by a first-color component filter, a second-color component filter, a third-color component filter and a fourth-color component filter in a four-color array filter C11 disposed in an imaging unit C1.

FIG. 2 shows an example of an array pattern of first-color component filters, second-color component filters, third-color component filters and fourth-color component filters. As shown in FIG. 2, the four-color array filter includes an even-numbered row in which first color component filters and second color component filters are arranged alternately in the order of the first-color component filter, the second-color component filter, the first-color component filter, the second-color component filter, . . . . The four-color array filter includes an odd-numbered row in which the third-color component filters and the fourth-color component filters (or no filters) are arranged alternately in the order of the third-color component filter, the fourth-color component filter, the third-color component filter, the fourth-color component filter, . . . .

Notation for Pixels in Four-Color Pixel Array

The notation for pixels in the four-color pixel array will now be described. The upper left area AR1 in FIG. 2 shows a matrix area of 5×5 pixels. In the upper left area AR1 in FIG. 2, P represents a pixel without showing its color component (This is applied to the areas AR2 to AR4 in FIG. 2).

The symbol P is numbered with its first digit indicating the row number of the pixel in the matrix area, and its second digit indicating the column number of the pixel in the matrix area. The other figures also show the pixel arrays in the same manner as described above. The symbol P in the embodiment and in the formulas therein may represent the pixel value. For example, P11 represents the pixel at the first row and the first column, and also indicates the pixel value of the pixel at the first row and the first column.

Light from a subject is collected by the optical system (not shown) included in the imaging unit C1, and then enters the image sensor (not shown) included in the imaging unit C1 through the four-color array filter C11 arranged on the imaging surface. Hereafter, the four-color array filter C11 has the array pattern shown in FIG. 2.

The image sensor in the imaging unit C1 converts the entering subject light for each pixel into an electrical signal (pixel signal) through photoelectric conversion. More specifically, the image sensor obtains a first-component pixel value at a first-component pixel, a second-component pixel value at a second-component pixel, a third-component pixel value at a third-component pixel, and a fourth-component pixel value at a fourth-component pixel. The image signal obtained through the above processing (image signal in which each pixel included in an image formed by the image signal has one of the first-component pixel value, the second-component pixel value, the third-component pixel value, and the fourth-component pixel value) is output from the imaging unit C1 to the signal processing unit C2.

The signal processing unit C2 subjects the image signal obtained by the imaging unit C1 to predetermined signal processing (e.g., gain adjustment, white balance adjustment, and gamma correction). The image signal (image signal D_raw) resulting from the predetermined signal processing is output to the correction value calculation unit 1, and the interpolation unit 3, which are included in the pixel interpolation processing unit 100.

1.2.1 Correlation Value Calculation Processing

Correlation value calculation processing will now be described.

The correlation value calculation unit 1 calculates a correlation value Cx for each pixel from the image signal D_raw (the image D_raw) output from the signal processing unit C2. This will be described below.

For a target pixel in an image D_raw (processing target pixel) output from the signal processing unit C2, the correlation value calculation unit 1 calculates the four correlation values described below.

(A1) a vertical direction correlation value Cv
(A2) a horizontal direction correlation value Ch
(A3) a first diagonal direction correlation value Cd1
(A4) a second diagonal direction correlation value Cd2

The process for calculating the correlation values (A1) to (A4) will now be described.

(A1) Vertical Direction Correlation Value Cv

First, the process for calculating the vertical direction correlation value Cv will now be described with reference to FIG. 3.

Figure 3:
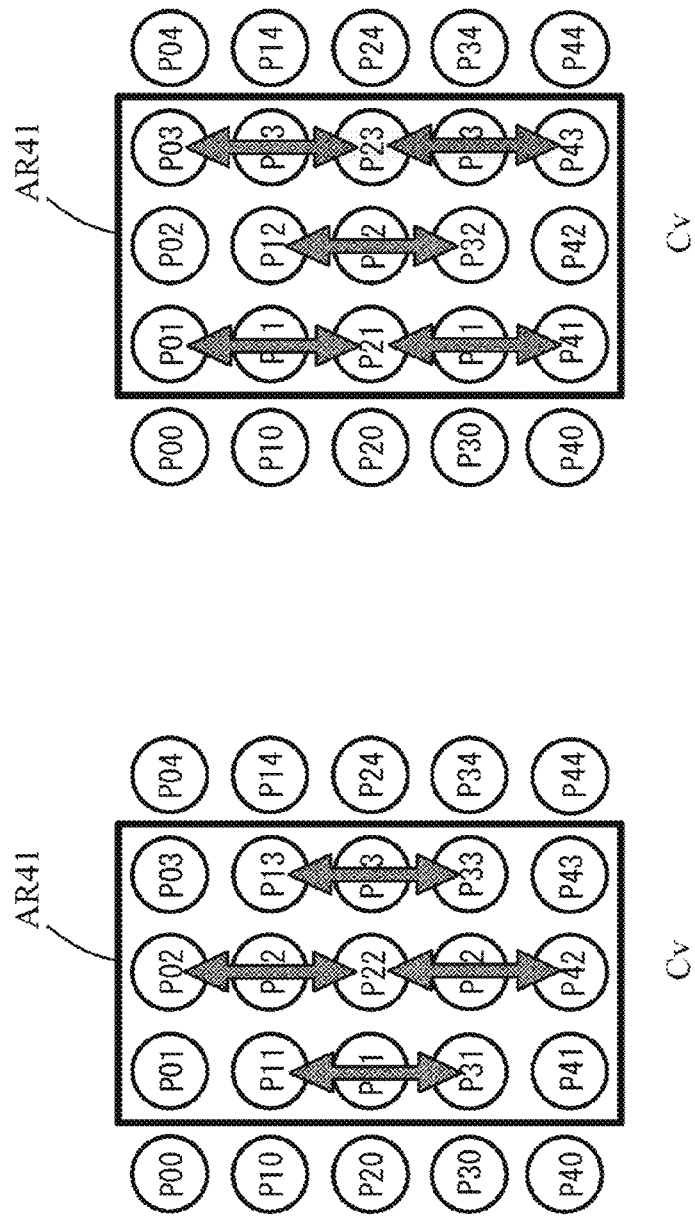
FIG. 3 is a diagram describing a process for calculating a vertical direction correlation value Cv.

FIG. 3 is a diagram describing the process for calculating the vertical direction correlation value Cv. FIG. 3 shows a matrix area of 5×5 pixels including a central pixel P22 as the center. In the figure, two pixels pointed by each of the two-headed arrows are pixels to be used for subtraction.

As shown in FIG. 3, the correlation value calculation unit 1 calculates a difference in absolute value between the pixel values of vertically adjacent pixels with the same color included in an area AR41 consisting of pixels P01 to P03, P11 to P13, P21 to P23, P31 to P33, and P41 to P43. The correlation value calculation unit 1 calculates the average (weighted average) of the calculated absolute value differences. More specifically, the correlation value calculation unit 1 calculates the vertical direction correlation value Cv through the processing corresponding to the formulas below.

$$\text{sum} = \text{abs}(P02 - P22) + \text{abs}(P22 - P42) + \text{abs}(P11 - P31) + \text{abs}(P13 - P33) + \\ \text{abs}(P12 - P32) \times 2 + (\text{abs}(P01 - P21) + \text{abs}(P21 - P41) + \\ \text{abs}(P03 - P23) + \text{abs}(P23 - P43))/2$$

$$Cv = \text{sum}/8$$

In the above formula, abs(P12–P32) is multiplied by a coefficient of 2, and (abs(P01–P21)+abs(P21–P41)+abs(P03–P23)+abs(P23–P43)) is multiplied by a coefficient of ½. This multiplication is for weighting in accordance with the distance from the central pixel (the distance on the image). The coefficient for the multiplication (weighting coefficient) should not be limited to the above value, but may be another value.

(A2) Horizontal Direction Correlation Value Ch

The process for calculating the horizontal direction correlation value Ch will now be described with reference to FIG. 4.

Figure 4:
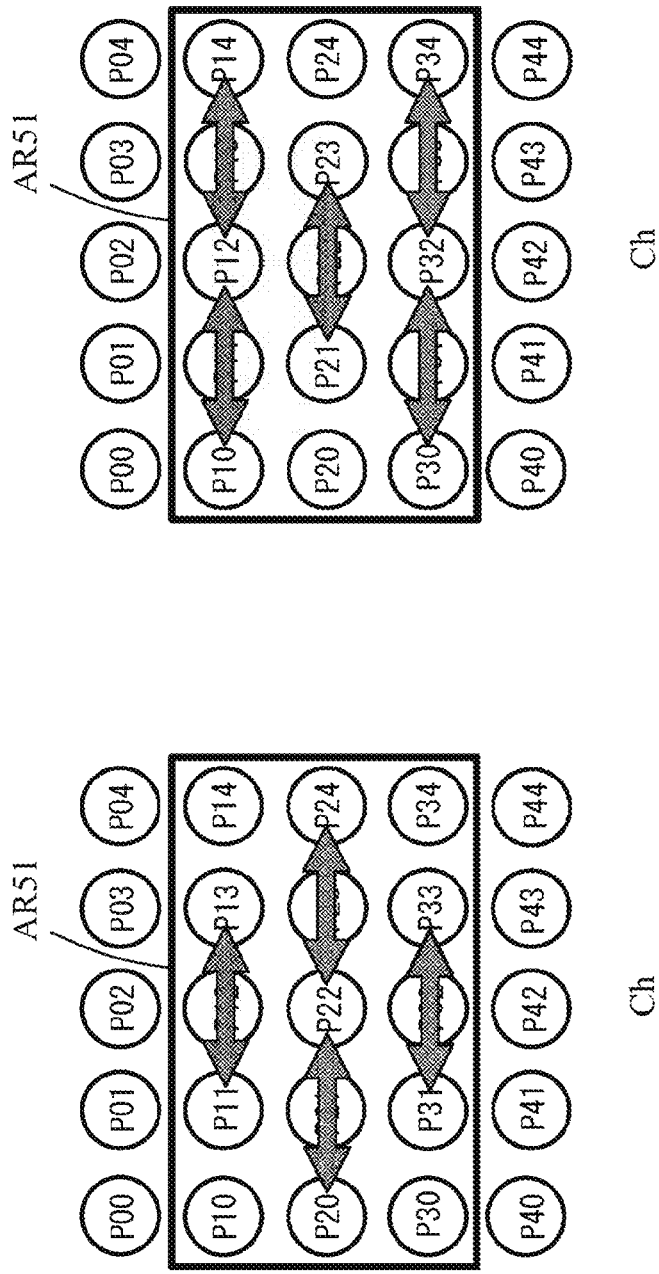
FIG. 4 is a diagram describing a process for calculating a horizontal direction correlation value Ch.

FIG. 4 is a diagram describing the process for calculating the horizontal direction correlation value Ch. FIG. 4 shows a matrix area of 5×5 pixels including a central pixel P22 as the center. In the figure, two pixels pointed by each of the two-headed arrows are pixels to be used for subtraction.

As shown in FIG. 4, the correlation value calculation unit 1 calculates a difference in absolute value between the pixel values of horizontally adjacent pixels with the same color included in an area AR51 consisting of pixels P10 to P14, P20 to P24, and P30 to P34. The correlation value calculation unit 1 calculates the average (weighted average) of the calculated absolute value differences. More specifically, the correlation value calculation unit 1 calculates the horizontal correlation value Ch through the processing corresponding to the formulas below.

$$\text{sum} = \text{abs}(P20 - P22) + \\ \text{abs}(P22 - P24) + \text{abs}(P11 - P13) + \text{abs}(P31 - P33) + \\ (\text{abs}(P10 - P12) + \text{abs}(P12 - P14) + \text{abs}(P30 - P32) + \\ \text{abs}(P32 - P34))/2 + \text{abs}(P21 - P23) \times 2$$

$$Ch = \text{sum}/8$$

In the above formula, abs(P21–P23) is multiplied by a coefficient of 2, and (abs(P10–P12)+abs(P12–P14)+abs(P30–P32)+abs(P32–P34)) is multiplied by a coefficient of ½. This multiplication is for weighting in accordance with the distance from the central pixel (the distance on the image). The coefficient for the multiplication (weighting coefficient) should not be limited to the above value, but may be another value.

(A3) First Diagonal Direction Correlation Value Cd1

The process for calculating the first diagonal direction correlation value Cd1 will now be described with reference to FIG. 5.

Figure 5:
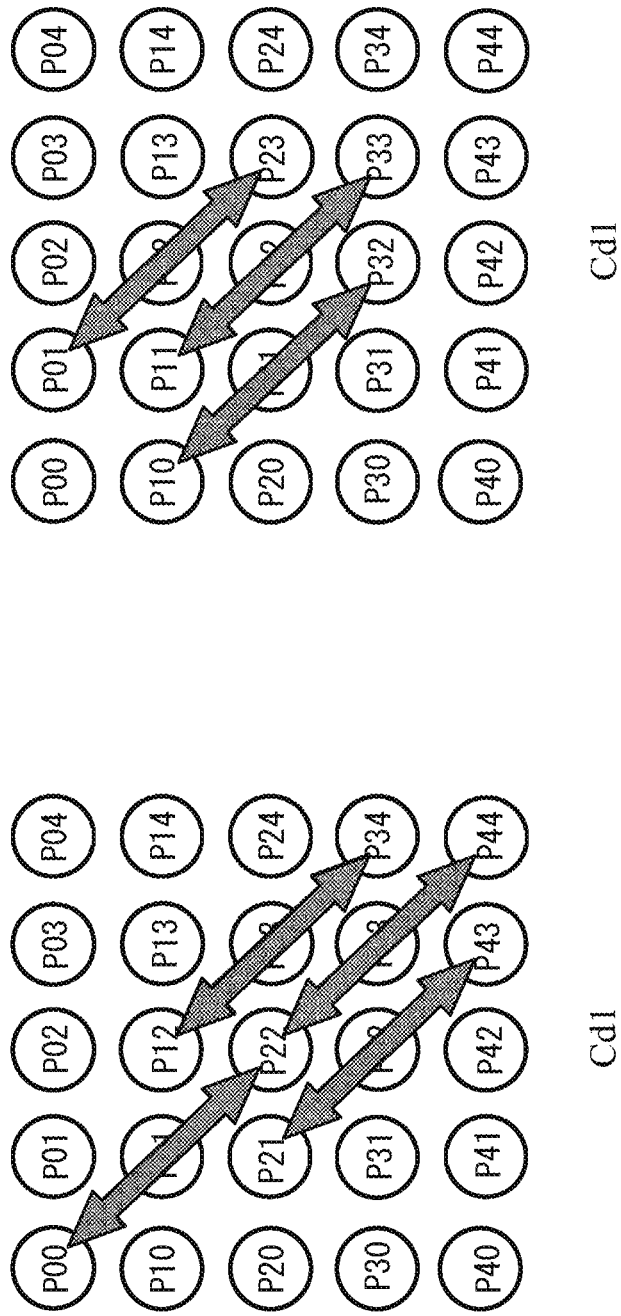
FIG. 5 is a diagram describing a process for calculating a first diagonal direction correlation value Cd1.

FIG. 5 is a diagram describing the process for calculating the first diagonal direction correlation value Cd1. FIG. 5 shows a matrix area of 5×5 pixels including a central pixel P22 as the center. In the figure, two pixels pointed by each of the two-headed arrows are pixels to be used for subtraction.

As shown in FIG. 5, the correlation value calculation unit 1 calculates a difference in absolute value between the pixel values of adjacent pixels with the same color in the first diagonal direction, and calculates the average (weighted average) of the calculated absolute value differences. More specifically, the correlation value calculation unit 1 calculates the first diagonal direction correlation value Cd1 through the processing corresponding to the formulas below.

$$\text{sum} = \text{abs}(P00 - P22) + \text{abs}(P22 - P44) + \\ \text{abs}(P11 - P33) \times 2 + \text{abs}(P12 - P34) + \\ \text{abs}(P10 - P32) + \text{abs}(P01 - P23) + \text{abs}(P21 - P43))$$

$$Cd1 = \text{sum}/8$$

In the above formula, abs(P11−P33) is multiplied by a coefficient of 2. This multiplication is for weighting in accordance with the distance from the central pixel (the distance on the image). The coefficient for the multiplication (weighting coefficient) should not be limited to the above value, but may be another value.

(A4) Second Diagonal Direction Correlation Value Cd2

The process for calculating the second diagonal direction correlation value Cd2 will now be described with reference to FIG. 6.

Figure 6:
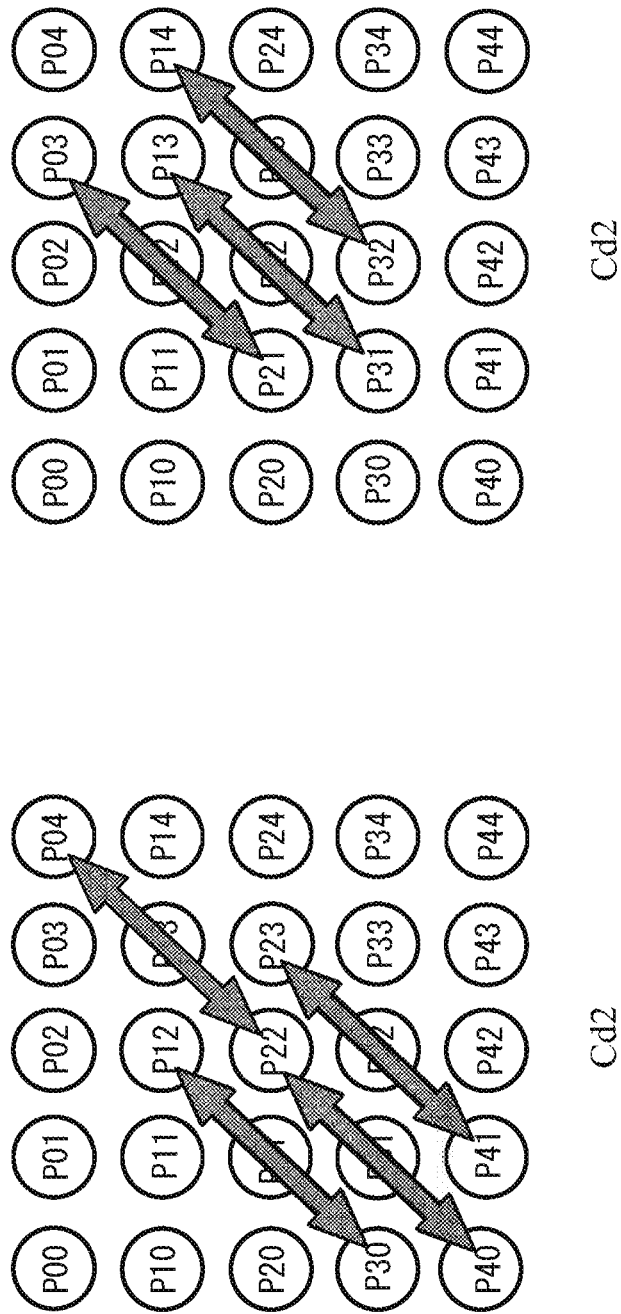
FIG. 6 is a diagram describing a process for calculating a second diagonal direction correlation value Cd2.

FIG. 6 is a diagram describing the process for calculating the second diagonal direction correlation value Cd2. FIG. 6 shows a matrix area of 5×5 pixels including a central pixel P22 as the center. In the figure, two pixels pointed by each of the two-headed arrows are pixels to be used for subtraction.

As shown in FIG. 6, the correlation value calculation unit 1 calculates a difference in absolute value between the pixel values of adjacent pixels with the same color in the second diagonal direction, and calculates the average (weighted average) of the calculated absolute value differences. More specifically, the correlation value calculation unit 1 calculates the second diagonal direction correlation value Cd2 through the processing corresponding to the formulas below.

$$\text{sum} = \text{abs}(P04 - P22) + \text{abs}(P22 - P40) + \text{abs}(P13 - P31) \times 2 + \\ \text{abs}(P12 - P30) + \text{abs}(P14 - P32) + \text{abs}(P03 - P21) + \text{abs}(P23 - P41)$$

$$Cd2 = \text{sum}/8$$

In the above formula, abs(P13−P31) is multiplied by a coefficient of 2. This multiplication is for weighting in accordance with the distance from the central pixel (the distance on the image). The coefficient for the multiplication (weighting coefficient) should not be limited to the above value, but may be another value.

The four color correlation values calculated by the correlation value calculation unit 1 through the above processing, which are (A1) the vertical direction correlation value Cv, (A2) the horizontal direction correlation value Ch, (A3) the first diagonal direction correlation value Cd1, and (A4) the second diagonal direction correlation value Cd2, are output to the correlation direction determination unit 2.

1.2.2 Processing by Correlation Direction Determination Unit 2

Figure 7:
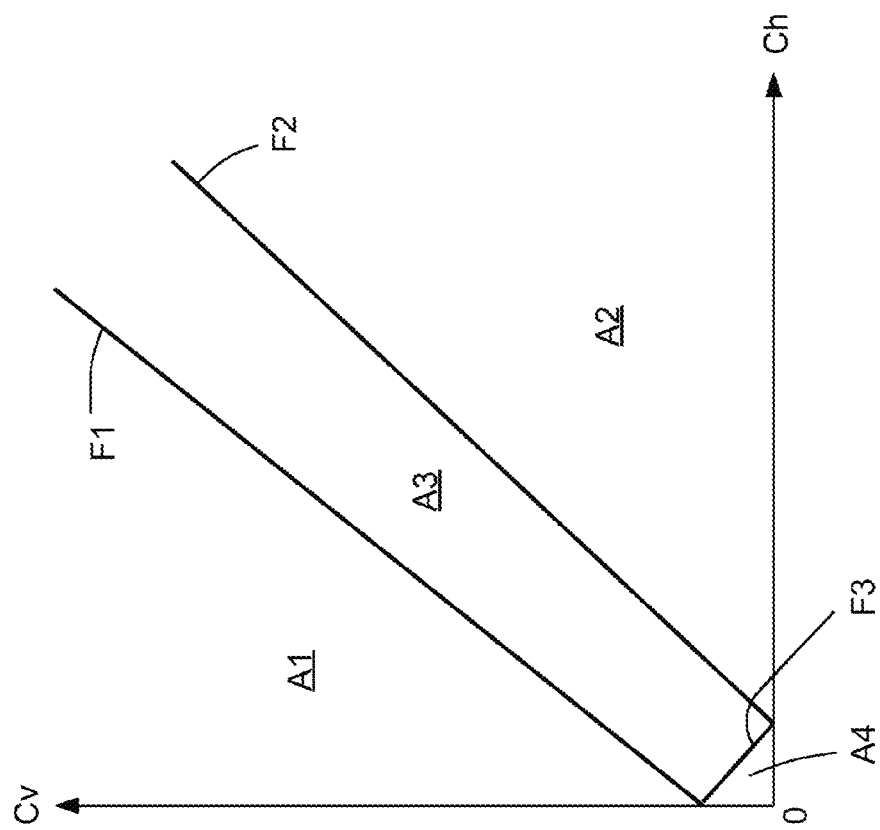
FIG. 7 is a relationship diagram determining the direction of correlation based on the correlation values Cv and Ch used for determination.
Figure 8:
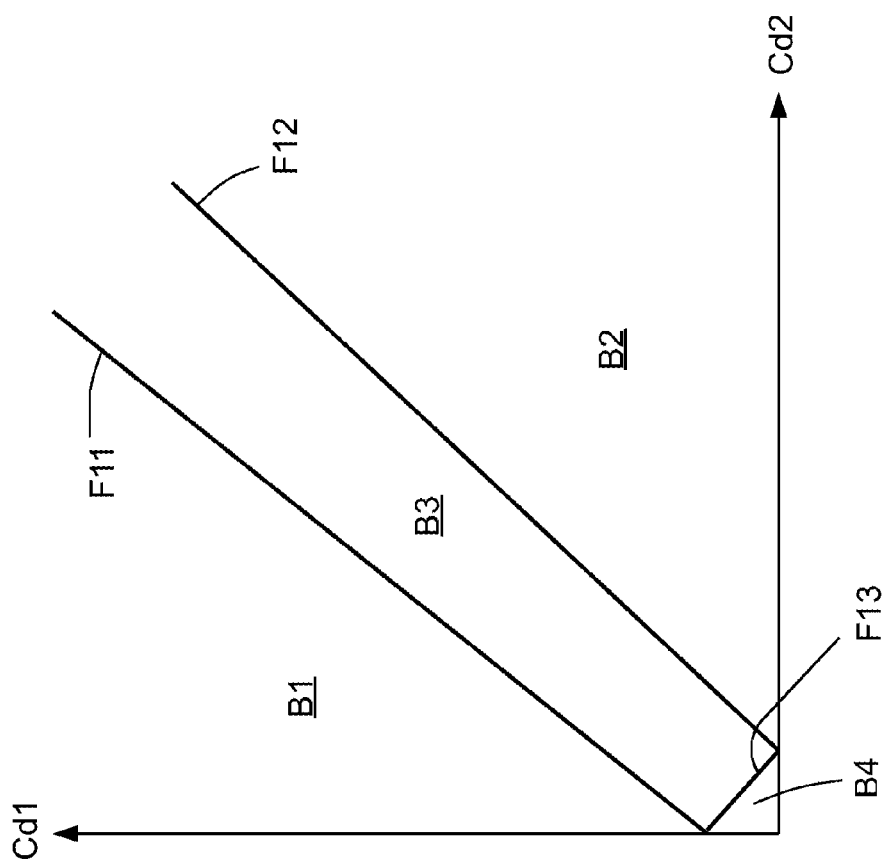
FIG. 8 is a relationship diagram determining the direction of correlation based on the correlation values Cd1 and Cd2 used for determination.

The correlation direction determination unit 2 determines the correlation direction for each pixel using the correlation values Cv, Ch, Cd1, and Cd2 calculated through the above processing based on the relationship diagram of FIG. 7 or FIG. 8.

FIG. 7 is a diagram showing the relationship between the correlation values Ch and Cv and the areas A1 to A4 for determining the correlation direction. In FIG. 7, the horizontal axis (X axis) indicates the correlation value Ch, and the vertical axis (Y axis) indicates the correlation value Cv. As shown in FIG. 7, the correlation direction determination areas A1 to A4 are defined by straight lines F1 to F3. The correlation direction determination area A1 is defined by the Y axis and the straight line F1. The correlation direction determination area A2 is defined by the X axis and the straight line F2. The correlation direction determination area A3 is defined by the straight lines F1, F2, and F3. The correlation direction determination area A4 is defined by the X axis, the Y axis, and the straight line F3.

FIG. 8 is a diagram showing the relationship between the correlation values Cd1 and Cd2 and the areas B1 to B4 for determining the correlation direction. In FIG. 8, the horizontal axis (X axis) indicates the correlation value Cd2, and the vertical axis (Y axis) indicates the correlation value Cd1. As shown in FIG. 8, the correlation direction determination areas B1 to B4 are defined by straight lines F11 to F13. The correlation direction determination area B1 is defined by the Y axis and the straight line F11. The correlation direction determination area B2 is defined by the X axis and the straight line F12. The correlation direction determination area B3 is defined by the straight lines F11, F12, and F13. The correlation direction determination area B4 is defined by the X axis, the Y axis, and the straight line F13.

The correlation direction determination unit 2 determines the correlation direction for each pixel using the correlation values Cv, Ch, Cd1, and Cd2 based on the relationship diagram of FIG. 7 or FIG. 8 through the processing (1) and (2) described below.

(1) The correlation direction determination unit 2 compares the four determination correlation values Cv, Ch, Cd1, and Cd2 for each pixel. When the correlation value Cv or the correlation value Ch is a minimum value among the four values, or in other words when Cv=min(Cv, Ch, Cd1, Cd2) or Ch=min(Cv, Ch, Cd1, Cd2), the correlation direction determination unit 2 determines the correlation direction based on the relationship diagram of FIG. 7.

More specifically, when the point corresponding to the determination correlation value (coordinate point (Ch, Cv)) is included in the area A1, the correlation direction determination unit 2 determines the correlation direction of the target pixel as the horizontal direction.

When the point corresponding to the determination correlation value (coordinate point (Ch, Cv)) is included in the area A2, the correlation direction determination unit 2 determines the correlation direction of the target pixel as the vertical direction.

When the point corresponding to the determination correlation value (coordinate point (Ch, Cv)) is included in the area A3, the correlation direction determination unit 2 determines that the target pixel has correlation in none of the directions.

When the point corresponding to the determination correlation value (coordinate point (Ch, Cv)) is included in the area A4, the correlation direction determination unit 2 determines that the target pixel has high correlation in both of the vertical and horizontal directions.

(2) The correlation direction determination unit 2 compares the four determination correlation values Cv, Ch, Cd1, and Cd2 for each pixel. When the correlation value Cd1 or the correlation value Cd2 is a minimum value of the four values, or in other words when Cd1=min(Cv, Ch, Cd1 Cd2) or when Cd2=min(Cv, Ch, Cd1, Cd2), the correlation direction determination unit 2 determines the correlation direction based on the relationship diagram of FIG. 8.

When the point corresponding to the determination correlation value (coordinate point (Cd2, Cd1)) is included in the area B1, the correlation direction determination unit 2 determines the correlation direction of the target pixel as the second diagonal direction (d2 direction).

When the point corresponding to the determination correlation value (coordinate point (Cd2, Cd1)) is included in the area B2, the correlation direction determination unit 2 determines the correlation direction of the target pixel as the first diagonal direction (d1 direction).

When the point corresponding to the determination correlation value (coordinate point (Cd2, Cd1)) is included in the area B3, the correlation direction determination unit 2 determines that the target pixel has correlation in none of the directions.

When the point corresponding to the determination correlation value (coordinate point (Cd2, Cd1)) is included in the area B4, the correlation direction determination unit 2 determines that the target pixel has high correlation in both of the vertical and horizontal directions.

As described above, the determination result of the correlation direction for each pixel (information Co_Dir about the correlation direction) is output from the correlation direction determination unit 2 to the interpolation unit 3.

The above relationship diagram is a mere example, and may be a relationship diagram having areas defined by other straight lines.

1.2.3 Processing by Interpolation Unit 3

The interpolation unit 3 performs interpolation on the image D_raw output from the signal processing unit C2 based on the correlation direction determined, for each pixel, by the correlation direction determination unit 2. This processing will now be described in detail.

1.2.3.1 Horizontal Direction Pixel Interpolation (Correlation Direction:Horizontal Direction)

When the correlation direction for the target pixel determined by the correlation direction determination unit 2 is the horizontal direction, the interpolation unit 3 performs the pixel interpolation processing for the target pixel through the processing corresponding to the formula below. After the pixel interpolation processing, the target pixel will have the pixel value D1out for its first-color component, the pixel value D2out for its second-color component, the pixel value D3out for its third-color component, and the pixel value D4out for its fourth-color component.

A case in which the target pixel is a first-color component pixel will be described below.

FIGS. 9 to 12 are diagrams describing the pixel interpolation processing in a case when the target pixel is a first-color component pixel and the correlation direction is the horizontal direction.

When the target pixel is a first-color component pixel, the interpolation unit 3 performs processing described below to obtain the first-color component pixel value D1out, the second-color component pixel value D2out, the third-color component pixel value D3out, and the fourth-color component pixel value D4out.

D1out

The interpolation unit 3 sets the pixel value D1out of the first-color component as the pixel value P22 of the target pixel. In other words, the interpolation unit 3 sets the value as D1out=P22.

D2out

The interpolation unit 3 performs the processing described below to obtain the pixel value D2out of the second-color component. The process for obtaining (calculating) the pixel value D2out of the second-color component will now be described with reference to FIG. 9.

Figure 9:
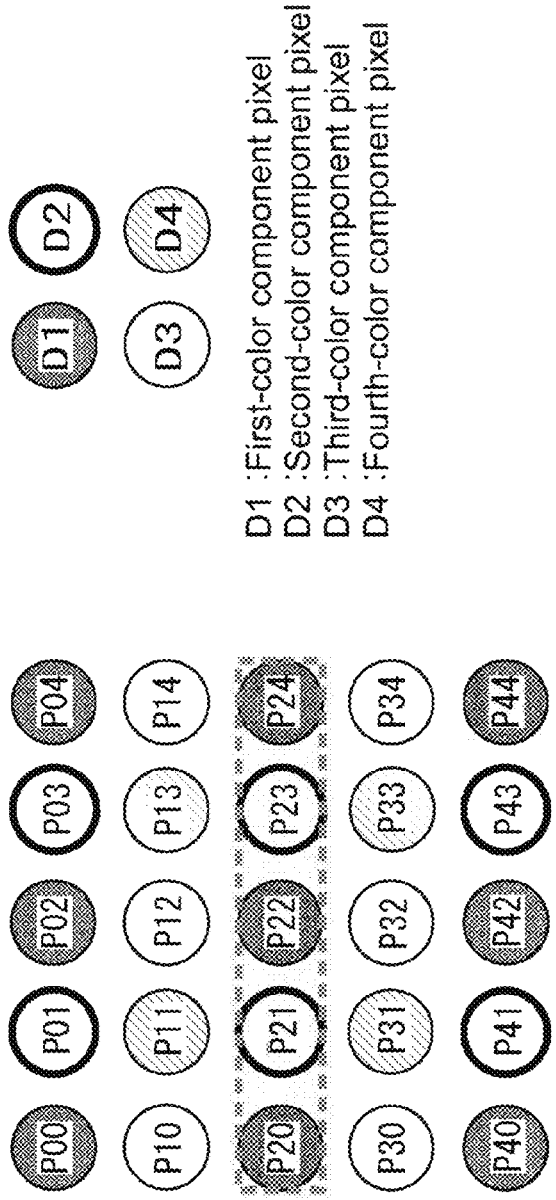
FIG. 9 is a diagram showing a matrix area of 5×5 pixels in a case when a central pixel (target pixel) is a first-color component pixel and a correlation direction is the horizontal direction.

FIG. 9 shows a matrix area of 5×5 pixels including a first-color component pixel as its central pixel (target pixel).

The interpolation unit 3 obtains the second-color component pixel value D2out using the five pixels P20 to P24 arranged in the horizontal direction with the target pixel P22 (first-color component pixel) in the center through the processing corresponding to the formulas below.

$$t0=(P21+P23)/2$$

$$t1=(P20-2\times P22+P24)\times gain0$$

$$D2out=t0-t1$$

The meaning of the above processing will now be explained.

The pixel Y22 (first-color component pixel P22) has a low-frequency component Y22L written below.

$$Y22L=(Y20+6\times Y22+Y24)/8.$$

Thus, the high-frequency component Y22H of the pixel Y22 is determined as written below.

$$Y22H=Y22-Y22L=-(Y20-2\times Y22+Y24)/8$$

The low-frequency component C22L of the second-color component value C22 of the pixel P22 is as written below.

$$C22L=(C21+2\times C22+C23)/4$$

Thus, the high-frequency component C22H of C22 is determined as written below.

$$C22H=C22-C22L=C22/2-(C21+C23)/4$$

When each color component for the pixel P22 is assumed to have substantially the same high-frequency component, Y22H≈C22H, and thus C22/2−(C21+C23)/4≈(Y20−2×Y22+Y24)/8.

This formula is solved for C22 as written below.

$$C22=(C21+C23)/2-(Y20-2\times Y22+Y24)/4$$

In this formula, the term (Y20−2×Y22+Y24) is a Laplacian component value (second order differential component value) in the horizontal direction. The second-color component value C22 of the pixel P22 can be calculated by subtracting the Laplacian component value multiplied by ¼ from the average of the values C21 and C23.

The interpolation unit 3 obtains the second-color component pixel value D2out using the formulas below.

$$t0=(P21+P23)/2$$

$$t1=(P20-2\times P22+P24)\times gain0$$

$$D2out=t0-t1$$

When gain0 is ¼, t1 is a Laplacian component value. The interpolation unit 3 can adjust the value gain0 to adjust the Laplacian component value, thereby allowing for adjusting the amount of high-frequency component of the pixel value D2out. For example, the interpolation unit 3 may adjust the value gain0 (adjust the Laplacian component value) in accordance with the optical characteristics of the imaging unit C1 (eg, the characteristics of the optical filters included in the imaging unit C1) to perform pixel interpolation processing with a higher quality.

D3out

The interpolation unit 3 performs the processing described below to obtain the pixel value D3out of the third-color component. The process for obtaining (calculating) the pixel value D3out of the third-color component will now be described with reference to FIGS. 10 and 11.

Figure 10:
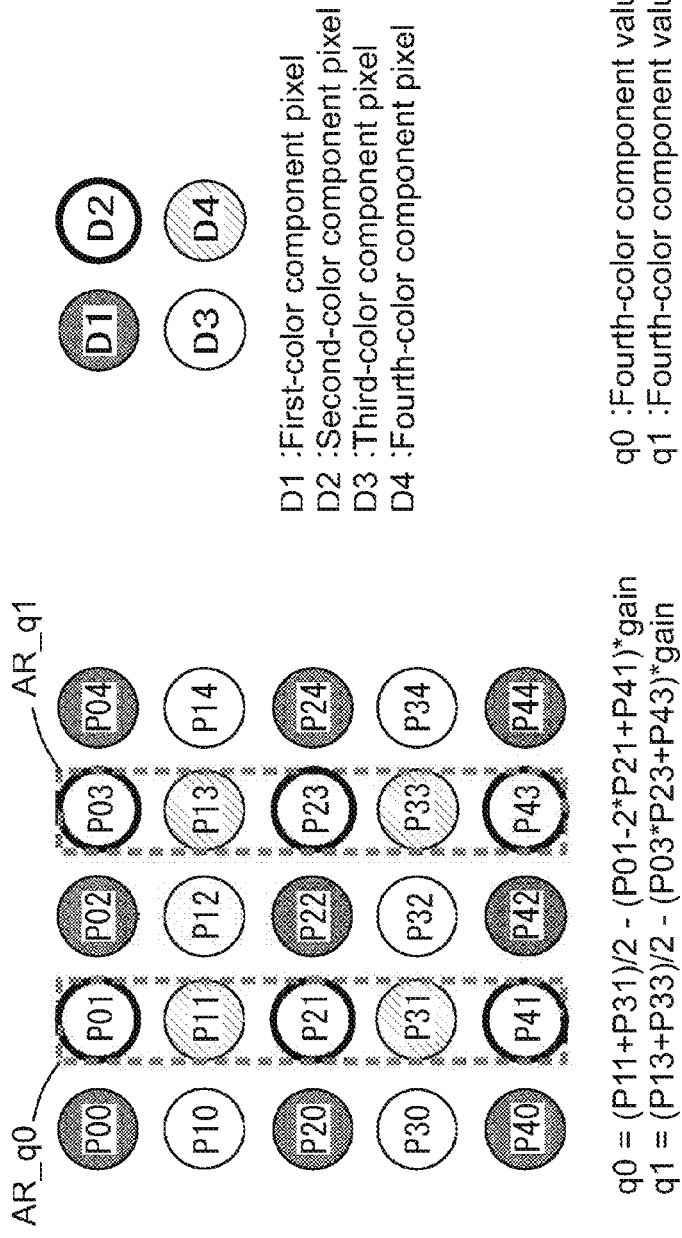
FIG. 10 is a diagram showing a matrix area of 5×5 pixels in a case when a central pixel (target pixel) is a first-color component pixel and a correlation direction is the horizontal direction.
Figure 11:
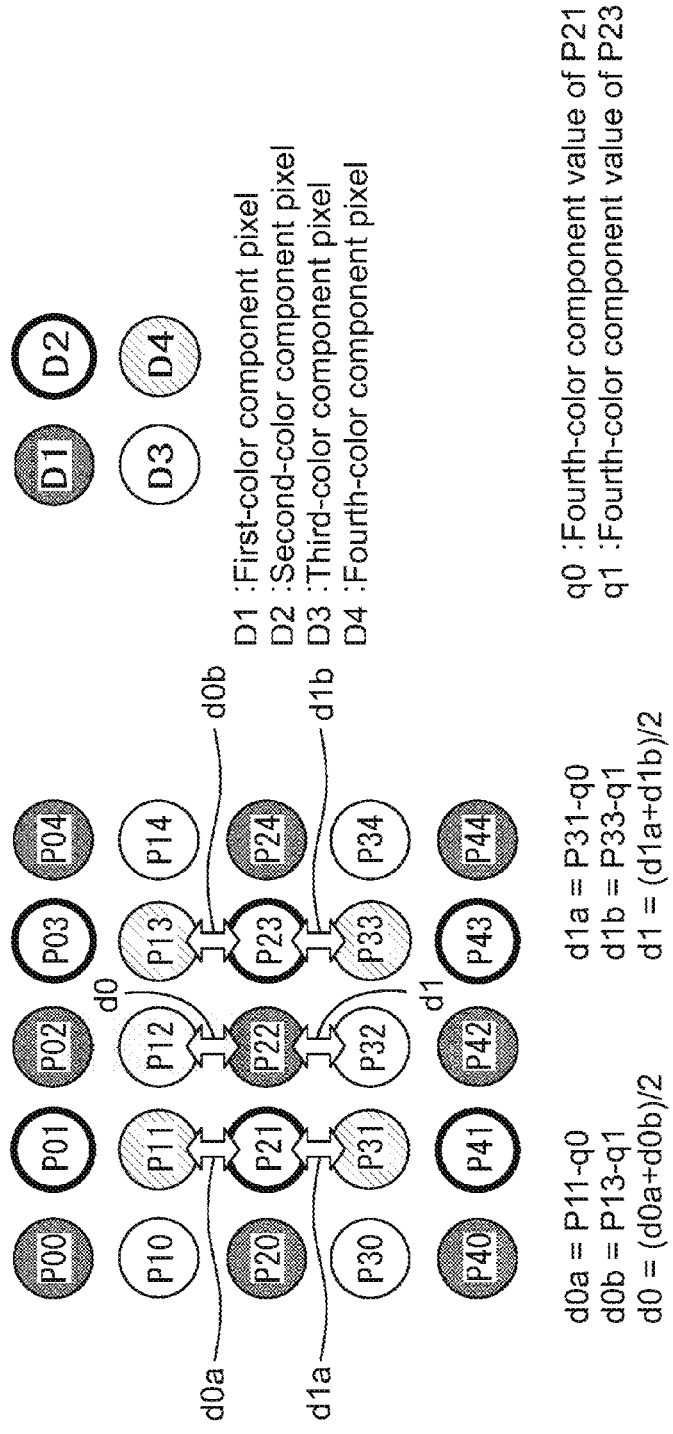
FIG. 11 is a diagram showing a matrix area of 5×5 pixels in a case when a central pixel (target pixel) is a first-color component pixel and a correlation direction is the horizontal direction.

FIGS. 10 and 11 each show a matrix area of 5×5 pixels including a first-color component pixel as its central pixel (target pixel).

The interpolation unit 3 obtains the fourth-color component value q0 of the pixel P21 using the pixels P01 to P41 included in the area AR_q0 shown in FIG. 10 through the processing corresponding to the formula below.

$$q0=(P11+P31)/2-(P01-2\times P21+P41)\times \text{gain1}$$

The term (P01−2×P21+P41) is a Laplacian component value, and gain1 is a gain for adjusting the Laplacian component value.

The interpolation unit 3 also obtains the fourth-color component value q1 of the pixel P23 using the pixels P03 to P43 included in the area AR_q1 shown in FIG. 10 through the processing corresponding to the formula below.

$$q1=(P13+P33)/2-(P03-2\times P23+P43)\times \text{gain2}$$

The term (P03−2×P23+P43) is a Laplacian component value, and gain2 is a gain for adjusting the Laplacian component value.

Next, as shown in FIG. 11, the interpolation unit 3 obtains a value d0a obtained by estimating a difference between the fourth-color component value of the pixel P11 and the fourth-color component value of the pixel P21, as follows:

$$d0a=P11-q0$$

q0: the fourth-color component value of the pixel P21. The interpolation unit 3 also obtains a d0b obtained by estimating a difference between the fourth-color component value of the pixel P13 and the fourth-color component value of the pixel P23, as follows:

$$d0b=P13-q1$$

q1: the fourth-color component value of the pixel P23.

The interpolation unit 3 also obtains a value d0 obtained by estimating a difference between the fourth-color component value of the pixel P12 and the fourth-color component value of the pixel P22 as follows:

$$d0=(d0a+d0b)/2.$$

High-frequency components of a pixel signal in the direction (normal direction to a correlation direction) orthogonal to a direction having high correlation (correlation direction) are commonly assumed to have high correlation (assumed to be similar) regardless of colors of color filters.

When the correlation direction is the horizontal direction, the high-frequency components of a pixel signal have high correlation in the vertical direction regardless of colors of color filters.

More specifically, it is determined that (1) the estimation value d0a of the difference of the fourth-color component value of the pixel P11 and the fourth-color component value of the pixel P21, (2) the estimation value d0b of the difference of the fourth-color component value of the pixel P13 and the fourth-color component value of the pixel P23, and (3) the estimation value d0 of the difference of the fourth-color component value of the pixel P12 and the fourth-color component value of the pixel P22 are highly correlated with each other.

Thus, obtaining an average value d0 of the values d0a and d0b written as d0=(d0a+d0b)/2 as described above allows the estimation value d0 of the difference between the fourth-color component value of the pixel P12 and the fourth-color component value of the pixel P22 to be appropriately estimated.

The interpolation unit 3 obtains a value d1a obtained by estimating a difference between the fourth-color component value of the pixel P31 and the fourth-color component value of the pixel P21 as follows:

$$d1a=P31-q0$$

q0: the fourth-color component value of the pixel P21.

The interpolation unit 3 also obtains a value d1b obtained by estimating a difference between the fourth-color component value of the pixel P33 and the fourth-color component value of the pixel P23 as follows:

$$d1b=P33-q1$$

q1: the fourth-color component value of the pixel P23.

The interpolation unit 3 obtains a value d1 obtained by estimating a difference between the fourth-color component value of the pixel P32 and the fourth-color component value of the pixel P22 as follows:

$$d1=(d1a+d1b)/2.$$

When the correlation direction is the horizontal direction, the high-frequency components of a pixel signal have high correlation in the vertical direction regardless of colors of color filters.

More specifically, it is determined that (1) the estimation value d1a of the difference of the fourth-color component value of the pixel P31 and the fourth-color component value of the pixel P21, (2) the estimation value d1b of the difference of the fourth-color component value of the pixel P33 and the fourth-color component value of the pixel P23, and (3) the estimation value d1 of the difference of the fourth-color component value of the pixel P32 and the fourth-color component value of the pixel P22 are highly correlated with each other.

Thus, obtaining an average value d1 of values d1a and d1b written as d1=(d1a+d1b)/2 as described above allows the estimation value d1 of the difference between the fourth-color component value of the pixel P32 and the fourth-color component value of the pixel P22 to be appropriately estimated.

The interpolation unit 3 then obtains the pixel value D3out of the third-color component by $$D3\text{out}=(P12+P32)/2-(d0+d1)\times \text{gain3}$$

gain3: a gain for adjustment using (1) the estimation value d0 of the difference between the fourth-color component value of the pixel P12 and the fourth-color component value of the pixel P22, and (2) the estimation value d1 of the difference between the fourth-color component value of the pixel P32 and the fourth-color component value of the pixel P22.

The interpolation unit 3 obtains (estimates) the pixel value D3out for the third-color component based on the average value of the pixel values of the pixels P12 and P32, which are pixels for the third-color component, and high-frequency components in the direction (vertical direction) orthogonal to the correlation direction (horizontal direction). In other words, the interpolation unit 3 obtains (estimates) the pixel value D3out of the third-color component with high accuracy by subtracting (d0+d1)×gain3, which represents a change ratio of the pixel signal in the direction (vertical direction) orthogonal to the correlation direction (horizontal direction), from the average value of the pixel value of the pixel P12 and the pixel value of the pixel P32, the pixels P12 and P32 being pixels for the third-color component.

D4out

The interpolation unit 3 performs the processing described below to obtain the pixel value D4out of the fourth-color component. The process for obtaining (calculating) the pixel value D4out of the fourth-color component will now be described with reference to FIG. 12.

Figure 12:
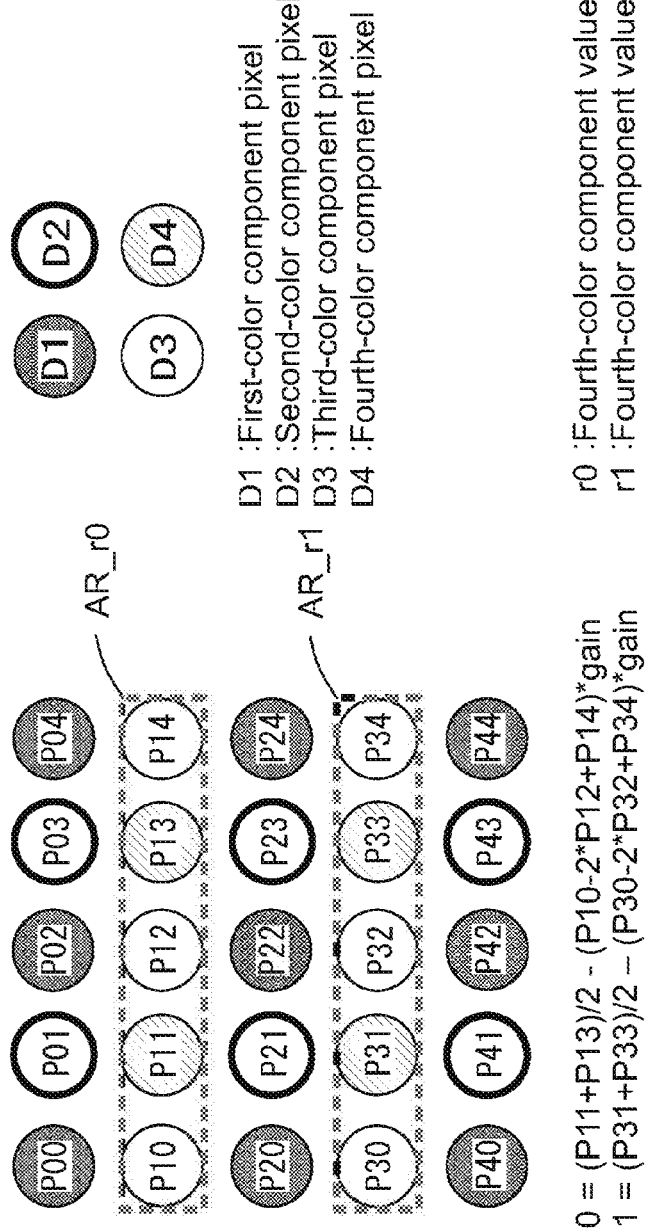
FIG. 12 is a diagram showing a matrix area of 5×5 pixels in a case when a central pixel (target pixel) is a first-color component pixel and a correlation direction is the horizontal direction.

FIG. 12 shows a matrix area of 5×5 pixels including a first-color pixel as its central pixel (target pixel).

The interpolation unit 3 obtains the fourth-color component value r0 of the pixel P12 using the pixels P10 to P14 included in the area AR_r0 shown in FIG. 12 through the processing corresponding to the formula below.

$$r0=(P11+P13)/2-(P10-2\times P12+P14)\times gain4$$

The term (P10−2×P12+P14) is a Laplacian component value, and gain4 is a gain for adjusting the Laplacian component value.

The interpolation unit 3 obtains the fourth-color component value r1 of the pixel P32 using the pixels P30 to P34 included in the area AR_r1 shown in FIG. 12 through the processing corresponding to the formula below.

$$r1=(P31+P33)/2-(P30-2\times P32+P34)\times gain5$$

The term (P30−2×P32+P34) is a Laplacian component value, and gain5 is a gain for adjusting the Laplacian component value.

The interpolation unit 3 obtains the pixel value D4out of the fourth-color component by $$D4out=(r0+r1)/2-(d0+d1)\times gain6$$

gain6: a gain for adjustment
using (1) the fourth-color component value r0 of the pixel P12, (2) the fourth-color component value r1 of the pixel P32, (3) the estimation value d0 of the difference between the fourth-color component value of the pixel P12 and the fourth-color component value of the pixel P22, and (4) the estimation value d1 of the difference between the fourth-color component value of the pixel P32 and the fourth-color component value of the pixel P22, which are described in calculation processing of the pixel value D3out for the third-color component.

As described above, the interpolation unit 3 obtains (estimates) the fourth-color component values r0 and r1 of the pixels P12 and P32, respectively, based on the Laplacian components calculated using the pixels located in an upper raw of the raw including the target pixel and the pixels located in a lower raw of the raw including the target pixel, and then obtains (estimates) the pixel value D4out for the fourth-color component based on the average value of the obtained fourth-color component values r0 and r1 of the pixels P12 and p32 and the high-frequency components in the direction (vertical direction) orthogonal to the correlation direction (horizontal direction). In other words, the interpolation unit 3 obtains (estimates) the pixel value D4out for the fourth-color component with high accuracy by subtracting (d0+d1)×gain6, which represents a change ratio of the pixel signal in the direction (vertical direction) orthogonal to the correlation direction (horizontal direction), from the average value of the fourth-color component values r0 and r1 of the pixels P12 and P32.

Note that in a case when the target pixel is a pixel other than a first-color component pixel, performing processing similar to the above-described processing achieves pixel interpolation processing with high accuracy.

1.2.3.2 Vertical Direction Pixel Interpolation (Correlation Direction:Vertical Direction)

When the correlation direction for the target pixel determined by the correlation direction determination unit 2 is the vertical direction, the interpolation unit 3 performs the pixel interpolation processing for the target pixel through the processing corresponding to the formula below. After the pixel interpolation processing, the target pixel will have the pixel value D1out for its first-color component, the pixel value D2out for its second-color component, the pixel value D3out for its third-color component, and the pixel value D4out for its fourth-color component.

A case in which the target pixel is a first-color component pixel will be described below.

FIGS. 13 to 16 are diagrams describing the pixel interpolation processing in a case when the target pixel is a first-color component pixel and the correlation direction is the vertical direction.

When the target pixel is a first-color component pixel, the interpolation unit 3 performs processing described below to obtain the first-color component pixel value D1out, the second-color component pixel value D2out, the third-color component pixel value D3out, and the fourth-color component pixel value D4out.

D1out

The interpolation unit 3 sets the pixel value D1out of the first-color component as the pixel value P22 of the target pixel. In other words, the interpolation unit 3 sets the value as D1out=P22.

D3out

The interpolation unit 3 performs the processing described below to obtain the pixel value D3out of the second-color component. The process for obtaining (calculating) the pixel value D2out of the second-color component will now be described with reference to FIG. 13.

Figure 13:
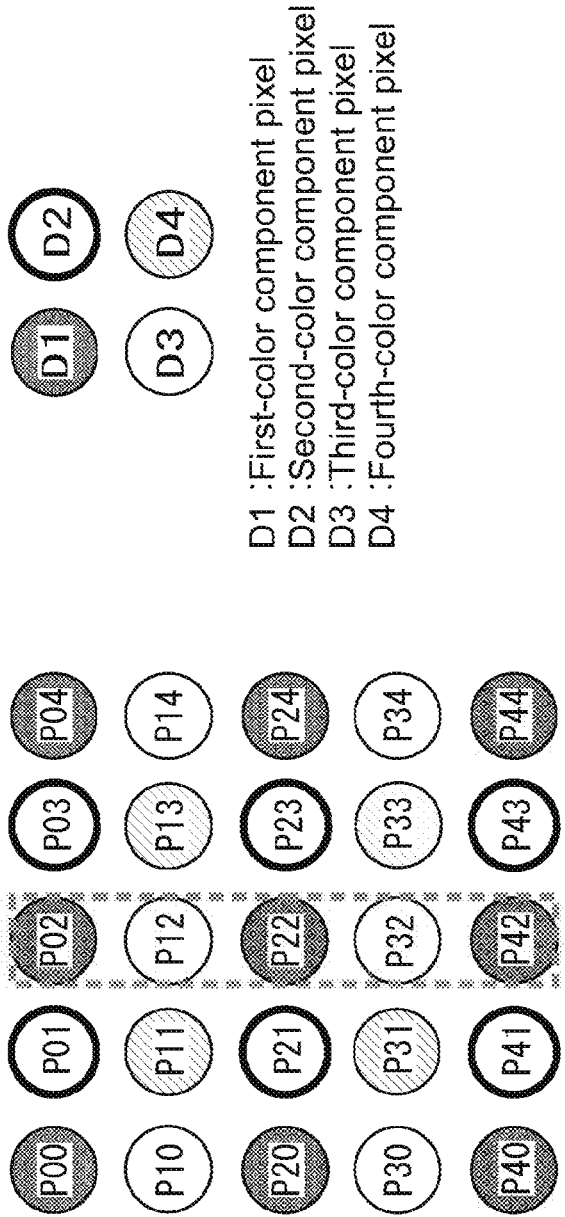
FIG. 13 is a diagram showing a matrix area of 5×5 pixels in a case when a central pixel (target pixel) is a first-color component pixel and a correlation direction is the vertical direction.

FIG. 13 shows a matrix area of 5×5 pixels including a first-color component pixel as its central pixel (target pixel).

The interpolation unit 3 obtains the third-color component pixel value D3out using the five pixels P02 to P42 arranged in the horizontal direction with the target pixel P22 (first-color component pixel) in the center through the processing corresponding to the formulas below.

$$t0=(P12+P32)/2$$

$$t1=(P02-2\times P22+P42)\times gain10$$

$$D3out=t0-t1$$

gain10: a gain for adjustment

When gain10 is ¼, t1 is a Laplacian component value. The interpolation unit 3 can adjust the value gain10 to adjust the Laplacian component value, thereby allowing for adjusting the amount of high-frequency component of D3out. For example, the interpolation unit 3 may adjust the value gain10 (adjust the Laplacian component value) in accordance with the optical characteristics of the imaging unit C1 (e.g., the characteristics of the optical filters included in the imaging unit C1) to perform pixel interpolation processing with a higher quality.

D2out

The interpolation unit 3 performs the processing described below to obtain the pixel value D2out of the second-color component. The process for obtaining (calculating) the pixel value D2out of the second-color component will now be described with reference to FIGS. 14 and 15.

Figure 14:
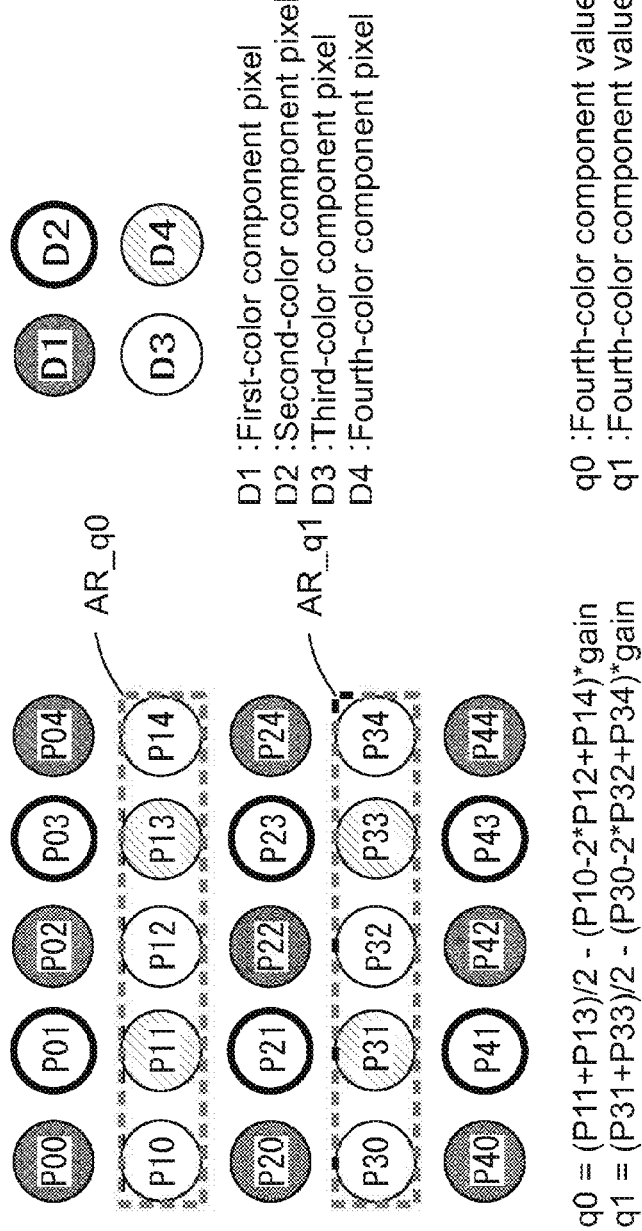
FIG. 14 is a diagram showing a matrix area of 5×5 pixels in a case when a central pixel (target pixel) is a first-color component pixel and a correlation direction is the vertical direction.
Figure 15:
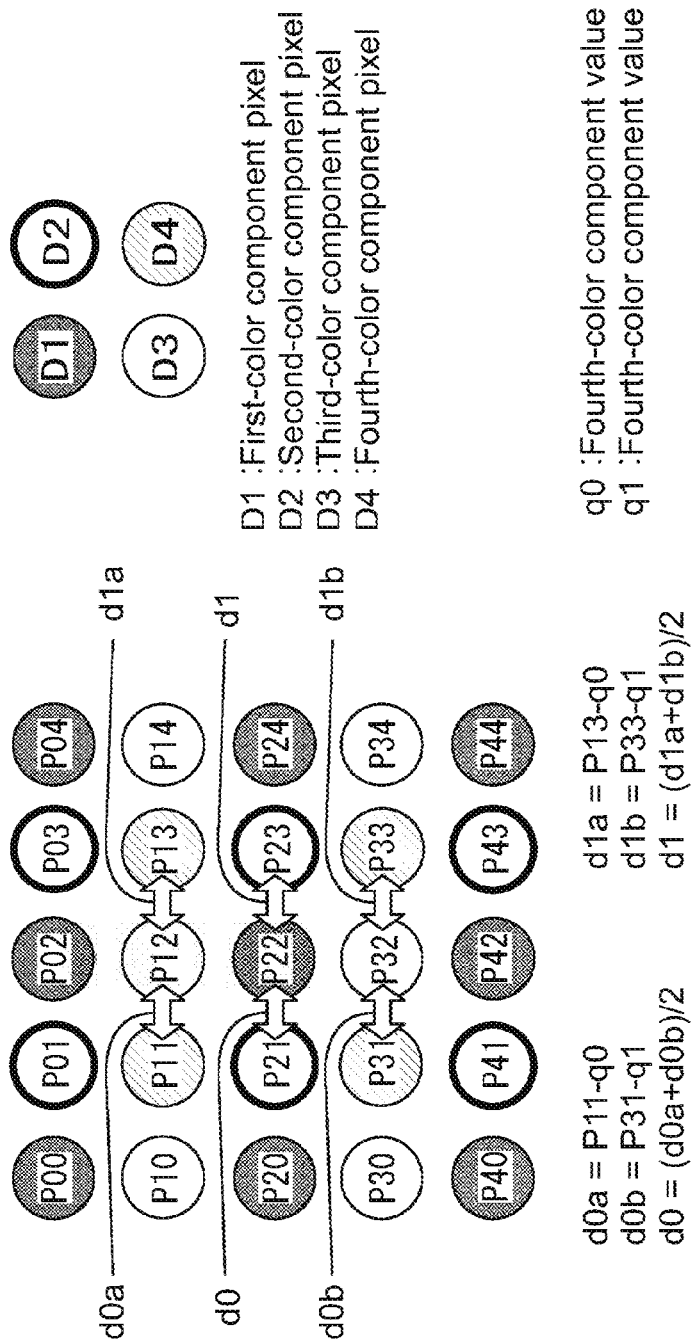
FIG. 15 is a diagram showing a matrix area of 5×5 pixels in a case when a central pixel (target pixel) is a first-color component pixel and a correlation direction is the vertical direction.

FIGS. 14 and 15 each show a matrix area of 5×5 pixels including a first-color component pixel as its central pixel (target pixel).

The interpolation unit 3 obtains the fourth-color component value q0 of the pixel P12 using the pixels P10 to P14 included in the area AR_q0 shown in FIG. 14 through the processing corresponding to the formula below.

$q0=(P11+P13)/2-(P10-2\times P12+P14)\times gain11$

The term (P10−2×P12+P14) is a Laplacian component value, and gain11 is a gain for adjusting the Laplacian component value.

The interpolation unit 3 also obtains the fourth-color component value q1 of the pixel P32 using the pixels P30 to P34 included in the area AR_q1 shown in FIG. 14 through the processing corresponding to the formula below.

$q1=(P31+P33)/2-(P30-2\times P32+P34)\times gain12$

The term (P30−2×P32+P34) is a Laplacian component value, and gain12 is a gain for adjusting the Laplacian component value.

Next, as shown in FIG. 15, the interpolation unit 3 obtains a value d0a obtained by estimating a difference between the fourth-color component value of the pixel P11 and the fourth-color component value of the pixel P12, as follows:

$d0a=P11-q0$ q0: the fourth-color component value of the pixel P12.
The interpolation unit 3 also obtains a d0b obtained by estimating a difference between the fourth-color component value of the pixel P31 and the fourth-color component value of the pixel P32, as follows:

$d0b=P31-q1$ q1: the fourth-color component value of the pixel P32.
The interpolation unit 3 also obtains a value d0 obtained by estimating a difference between the fourth-color component value of the pixel P21 and the fourth-color component value of the pixel P22 as follows:

$d0=(d0a+d0b)/2.$

High-frequency components of a pixel signal in the direction (normal direction to a correlation direction) orthogonal to a direction having high correlation (correlation direction) are commonly assumed to have high correlation (assumed to be similar) regardless of colors of color filters.

When the correlation direction is the vertical direction, the high-frequency components of a pixel signal have high correlation in the horizontal direction regardless of colors of color filters.

More specifically, it is determined that (1) the estimation value d0a of the difference of the fourth-color component value of the pixel P11 and the fourth-color component value of the pixel P12, (2) the estimation value d0b of the difference of the fourth-color component value of the pixel P31 and the fourth-color component value of the pixel P32, and (3) the estimation value d0 of the difference of the fourth-color component value of the pixel P21 and the fourth-color component value of the pixel P22 are highly correlated with each other.

Thus, obtaining an average value d0 of the values d0a and d0b written as d0=(d0a+d0b)/2 as described above allows the estimation value d0 of the difference between the fourth-color component value of the pixel P21 and the fourth-color component value of the pixel P22 to be appropriately estimated.

As shown in FIG. 15, the interpolation unit 3 obtains a value d1 a obtained by estimating a difference between the fourth-color component value of the pixel P13 and the fourth-color component value of the pixel P12 as follows:

$d1a=P13-q0$ q0: the fourth-color component value of the pixel P12.
The interpolation unit 3 also obtains a value d1b obtained by estimating a difference between the fourth-color component value of the pixel P33 and the fourth-color component value of the pixel P32 as follows:

$d1b=P33-q1$ q1: the fourth-color component value of the pixel P32.
The interpolation unit 3 obtains a value d1 obtained by estimating a difference between the fourth-color component value of the pixel P23 and the fourth-color component value of the pixel P22 as follows:

$d1=(d1a+d1b)/2.$

When the correlation direction is the vertical direction, the high-frequency components of a pixel signal have high correlation in the horizontal direction regardless of colors of color filters.

More specifically, it is determined that (1) the estimation value d1a of the difference of the fourth-color component value of the pixel P13 and the fourth-color component value of the pixel P12, (2) the estimation value d1b of the difference of the fourth-color component value of the pixel P33 and the fourth-color component value of the pixel P32, and (3) the estimation value d1 of the difference of the fourth-color component value of the pixel P23 and the fourth-color component value of the pixel P22 are highly correlated with each other.

Thus, obtaining an average value d1 of the values d1a and d1b written as d1=(d1a+d1b)/2 as described above allows the estimation value d1 of the difference between the fourth-color component value of the pixel P23 and the fourth-color component value of the pixel P22 to be appropriately estimated.

The interpolation unit 3 then obtains the pixel value D2out of the second-color component by $D2out=(P21+P23)/2-(d0+d1)\times gain13$ gain13: a gain for adjustment
using (1) the estimation value d0 of the difference between the fourth-color component value of the pixel P21 and the fourth-color component value of the pixel P22, and (2) the estimation value d1 of the difference between the fourth-color component value of the pixel P23 and the fourth-color component value of the pixel P22.

The interpolation unit 3 obtains (estimates) the pixel value D2out for the second-color component based on the average value of the pixel values of the pixels P21 and P23, which are pixels for the second-color component, and high-frequency components in the direction (horizontal direction) orthogonal to the correlation direction (vertical direction). In other words, the interpolation unit 3 obtains (estimates) the pixel value D2out of the second-color component with high accuracy by subtracting (d0+d1)×gain13, which represents a change ratio of the pixel signal in the direction (horizontal direction) orthogonal to the correlation direction (vertical direction), from the average value of the pixel value of the pixel P21 and the pixel value of the pixel P23, the pixels P21 and P23 being pixels for the second-color component.

D4out

The interpolation unit 3 performs the processing described below to obtain the pixel value D4out of the fourth-color component. The process for obtaining (calculating) the pixel value D4out of the fourth-color component will now be described with reference to FIG. 16.

Figure 16:
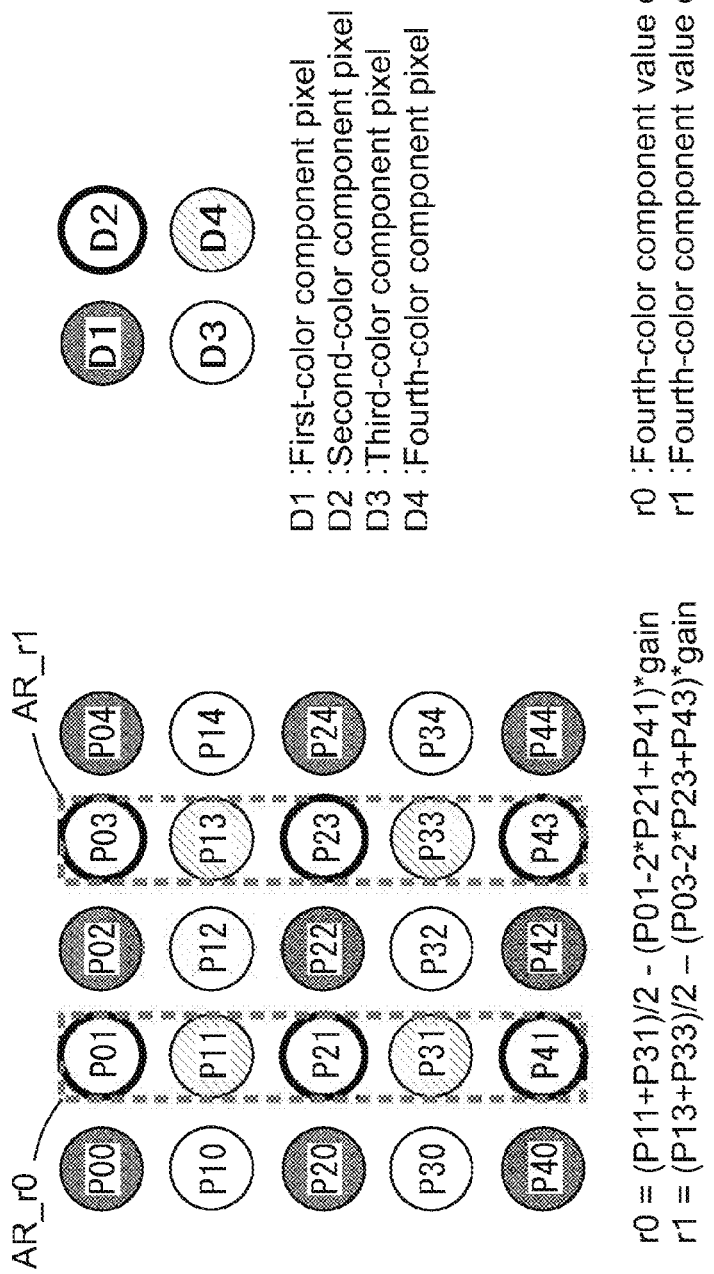
FIG. 16 is a diagram showing a matrix area of 5×5 pixels in a case when a central pixel (target pixel) is a first-color component pixel and a correlation direction is the vertical direction.

FIG. 16 shows a matrix area of 5×5 pixels including a first-color component pixel as its central pixel (target pixel).

The interpolation unit 3 obtains the fourth-color component value r0 of the pixel P21 using the pixels P01 to P41 included in the area AR_r0 shown in FIG. 16 through the processing corresponding to the formula below.

$$r0=(P11+P31)/2-(P01-2\times P21+P41)\times gain14$$

The term (P01−2×P21+P41) is a Laplacian component value, and gain14 is a gain for adjusting the Laplacian component value.

The interpolation unit 3 also obtains the fourth-color component value r1 of the pixel P23 using the pixels P03 to P43 included in the area AR_r1 shown in FIG. 16 through the processing corresponding to the formula below.

$$r1=(P13+P33)/2-(P03-2\times P23+P43)\times gain15$$

The term (P03−2×P23+P43) is a Laplacian component value, and gain15 is a gain for adjusting the Laplacian component value.

The interpolation unit 3 obtains the pixel value D4out of the fourth-color component by $$D4out=(r0+r1)/2-(d0+d1)\times gain16$$

gain16: a gain for adjustment
using (1) the fourth-color component value r0 of the pixel 21, (2) the fourth-color component value r1 of the pixel 23, (3) the estimation value d0 of the difference between the fourth-color component value of the pixel P21 and the fourth-color component value of the pixel P22, and (4) the estimation value d1 of the difference between the fourth-color component value of the pixel P23 and the fourth-color component value of the pixel P22, which are described in calculation processing of the pixel value D2out for the second-color component.

As described above, the interpolation unit 3 obtains (estimates) the fourth-color component values r0 and r1 of the pixels P21 and P23, respectively, based on the Laplacian components calculated using the pixels located in a column on the right side of the column including the target pixel and the pixels located in a column on the left side of the column including the target pixel, and then obtains (estimates) the pixel value D4out for the fourth-color component based on the average value of the obtained fourth-color component values r0 and r1 of the pixels P21 and p23 and the high-frequency components in the direction (horizontal direction) orthogonal to the correlation direction (vertical direction). In other words, the interpolation unit 3 obtains (estimates) the pixel value D4out for the fourth-color component with high accuracy by subtracting (d0+d1)×gain16, which represents a change ratio of the pixel signal in the direction (horizontal direction) orthogonal to the correlation direction (vertical direction), from the average value of the fourth-color component values r0 and r1 of the pixels P21 and P23.

Note that in a case when the target pixel is a pixel other than a first-color component pixel, performing processing similar to the above-described processing achieves pixel interpolation processing with high accuracy.

1.2.3.3 First Diagonal Direction Pixel Interpolation (Correlation Direction:First Diagonal Direction)

When the correlation direction for the target pixel determined by the correlation direction determination unit 2 is the first diagonal direction, the interpolation unit 3 performs the pixel interpolation processing for the target pixel through the processing corresponding to the formula below.

A case in which the target pixel is a first-color component pixel will be described below.

Figure 17:
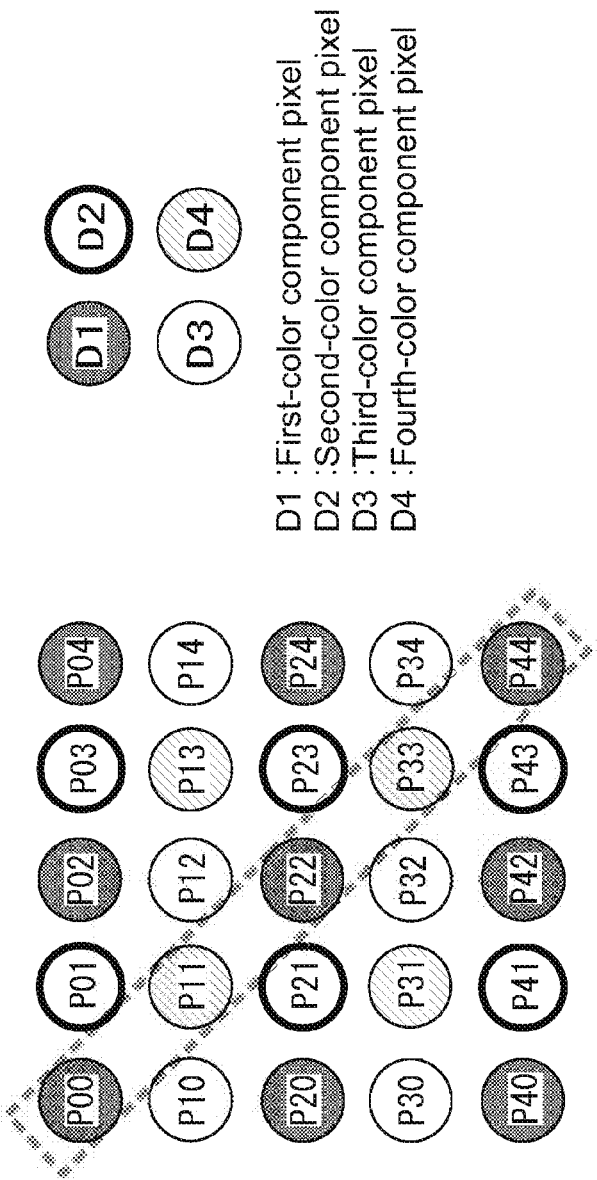
FIG. 17 is a diagram showing a matrix area of 5×5 pixels in a case when a central pixel (target pixel) is a first-color component pixel and a correlation direction is the first diagonal direction.
Figure 18:
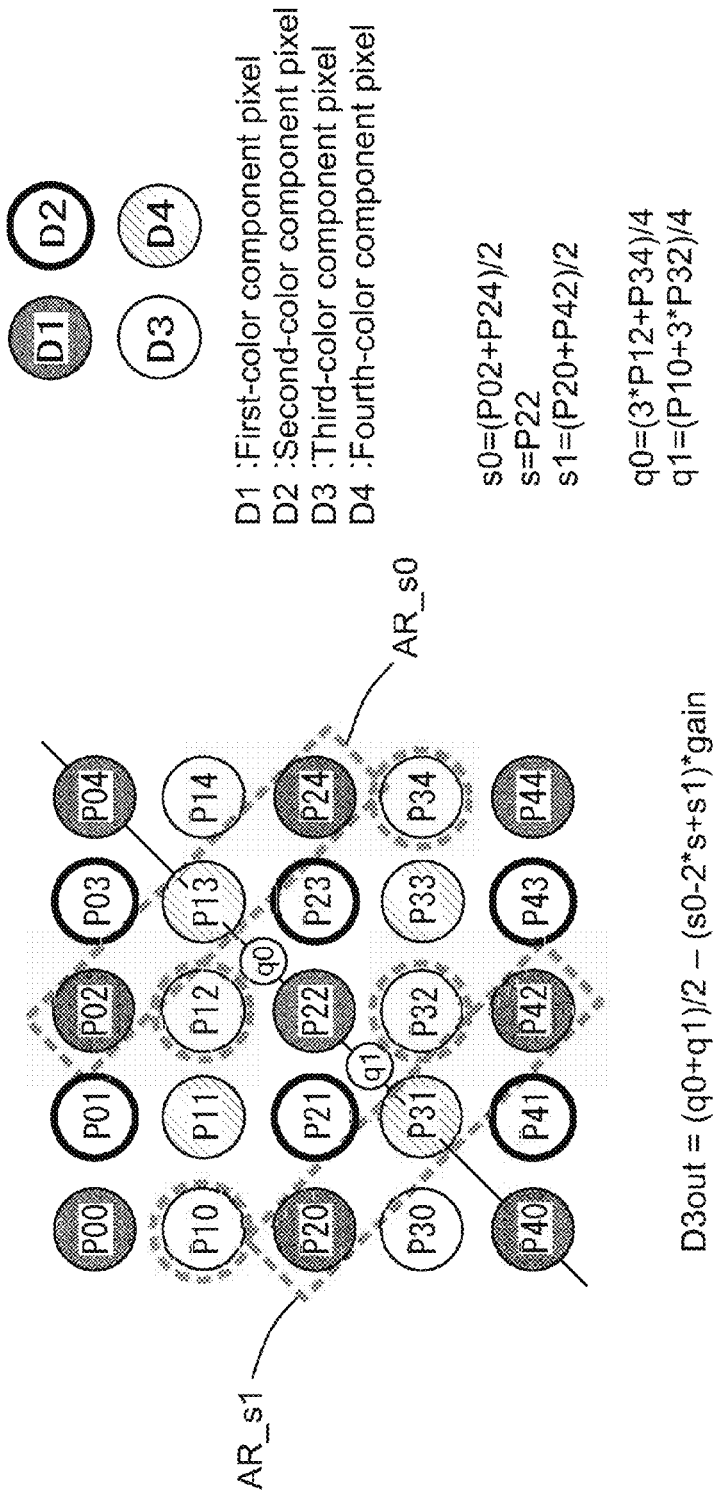
FIG. 18 is a diagram showing a matrix area of 5×5 pixels in a case when a central pixel (target pixel) is a first-color component pixel and a correlation direction is the first diagonal direction.
Figure 19:
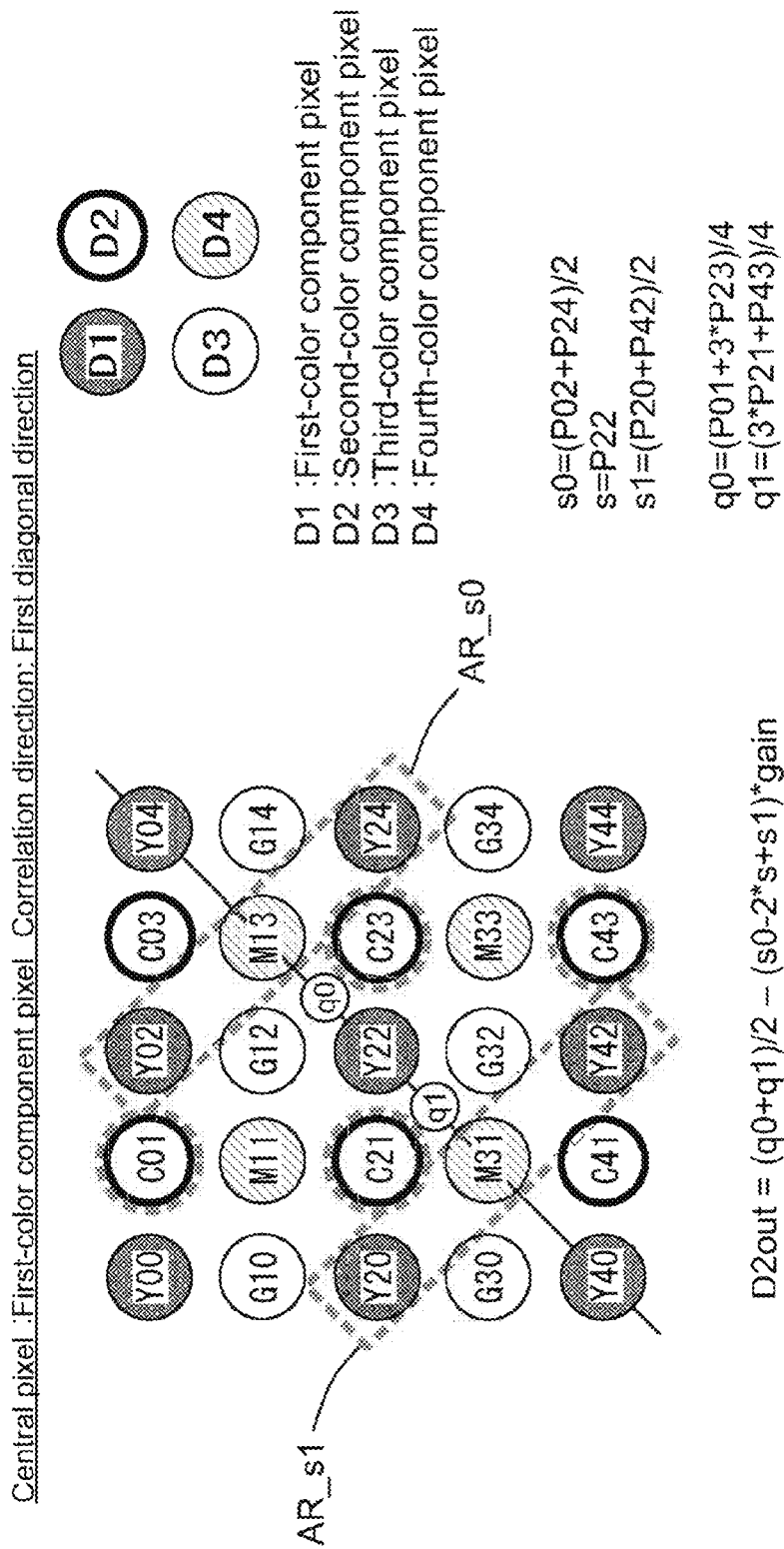
FIG. 19 is a diagram showing a matrix area of 5×5 pixels in a case when a central pixel (target pixel) is a first-color component pixel and a correlation direction is the first diagonal direction.

FIGS. 17 to 19 are diagrams describing the pixel interpolation processing in a case when the target pixel is a first-color component pixel and the correlation direction is the first diagonal direction.

When the target pixel is a first-color component pixel, the interpolation unit 3 performs processing described below to obtain the first-color component pixel value D1out, the second-color component pixel value D2out, the third-color component pixel value D3out, and the fourth-color component pixel value D4out.

D1out

The interpolation unit 3 sets the pixel value D1out of the first-color component as the pixel value P22 of the target pixel. In other words, the interpolation unit 3 sets the value as D1out=P22.

D4out

The interpolation unit 3 performs the processing described below to obtain the pixel value D4out of the fourth-color component. The process for obtaining (calculating) the pixel value D4out of the fourth-color component will now be described with reference to FIG. 17.

FIG. 17 shows a matrix area of 5×5 pixels including a first-color component pixel as its central pixel (target pixel).

The interpolation unit 3 obtains the fourth-color component pixel value D4out of the pixel P22 using the five pixels P00, P11, P22, P33, and P44 through the processing described below.

$$D4out=(P11+P33)/2-(P00-2\times P22+P44)\times gain40$$

The term (P00−2×P22+P44) is a Laplacian component value, and gain40 is a gain for adjusting the Laplacian component value.

D3out

The interpolation unit 3 performs the processing described below to obtain the pixel value D3out of the third-color component of the pixel P22.

As shown in FIG. 18, the interpolation unit 3 obtains the first-color component value s0 of the pixel P13, the first-color component value s of the pixel P22, and the first-color component value s1 of the pixel P31 through the processing corresponding to formulas below.

$$s0=(P02+P24)/2$$

$$s=P22$$

$$s1=(P20+P42)/2$$

As shown in FIG. 18, the interpolation unit 3 obtains the third-color component q0 of the midpoint between the pixels P13 and P22 and the third-color component q1 of the midpoint between the pixels P22 and P31 through the processing (internal division processing) corresponding to the formulas below.

$$q0=(3\times P12+P34)/4$$

$$q1=(P10+3\times P32)/4$$

The interpolation unit 3 then obtains the third-color component D3out of the pixel P22 through the processing corresponding to the formula below.

$$D3\text{out}=(q0+q1)/2-(s0-2\times s+s1)\times \text{gain}41$$

The term (s0−2×s+s1) is a Laplacian component value, and gain41 is a gain for adjusting the Laplacian component value.

In this manner, the interpolation unit 3 obtains the third-color component value D3out of the pixel P22 using (1) the same color components (in the above case, the first-color component value) s0, s, and s1, which are obtained based on their high correlations in the first diagonal direction, and (2) the same color components (in the above case, third-color component value) q0 and q1, which are obtained based on their high correlations in the first diagonal direction. The interpolation unit 3 can thus obtain an interpolated pixel value with high accuracy (the third-color component value D3out of the pixel P22) using high correlations in the first diagonal direction.

D2out

As shown in FIG. 19, the interpolation unit 3 obtains the first-color component value s0 of the pixel P13, the first-color component value s of the pixel P22, and the first-color component value s1 of the pixel P31 through the processing corresponding to formulas below.

$$s0=(P02+P24)/2$$

$$s=P22$$

$$s1=(P20+P42)/2$$

As shown in FIG. 19, the interpolation unit 3 obtains the second-color component q0 of the midpoint between the pixels P13 and P22 and the second-color component q1 of the midpoint between the pixels P22 and P31 through the processing (internal division processing) corresponding to the formulas below.

$$q0=(P01+3\times P23)/4$$

$$q1=(3\times P21+P43)/4$$

The interpolation unit 3 then obtains the second-color component D2out of the pixel P22 through the processing corresponding to the formula below.

$$D2\text{out}=(q0+q1)/2-(s0-2\times s+s1)\times \text{gain}42$$

The term (s0−2×s+s1) is a Laplacian component value, and gain42 is a gain for adjusting the Laplacian component value.

In this manner, the interpolation unit 3 obtains the second-color component value D2out of the pixel P22 using (1) the same color components (in the above case, the first-color component value) s0, s, and s1, which are obtained based on their high correlations in the first diagonal direction, and (2) the same color components (in the above case, second-color component value) q0 and q1, which are obtained based on their high correlations in the first diagonal direction. The interpolation unit 3 can thus obtain an interpolated pixel value with high accuracy (the second-color component value D2out of the pixel P22) using high correlations in the first diagonal direction.

Note that in a case when the target pixel is a pixel other than a first-color component pixel, performing processing similar to the above-described processing achieves pixel interpolation processing with high accuracy.

1.2.3.4 Second Diagonal Direction Pixel Interpolation (Correlation Direction:Second Diagonal Direction)

When the correlation direction for the target pixel determined by the correlation direction determination unit 2 is the second diagonal direction, the interpolation unit 3 performs the pixel interpolation processing for the target pixel through the processing corresponding to the formula below.

A case in which the target pixel is a first-color component pixel will be described below.

Figure 20:
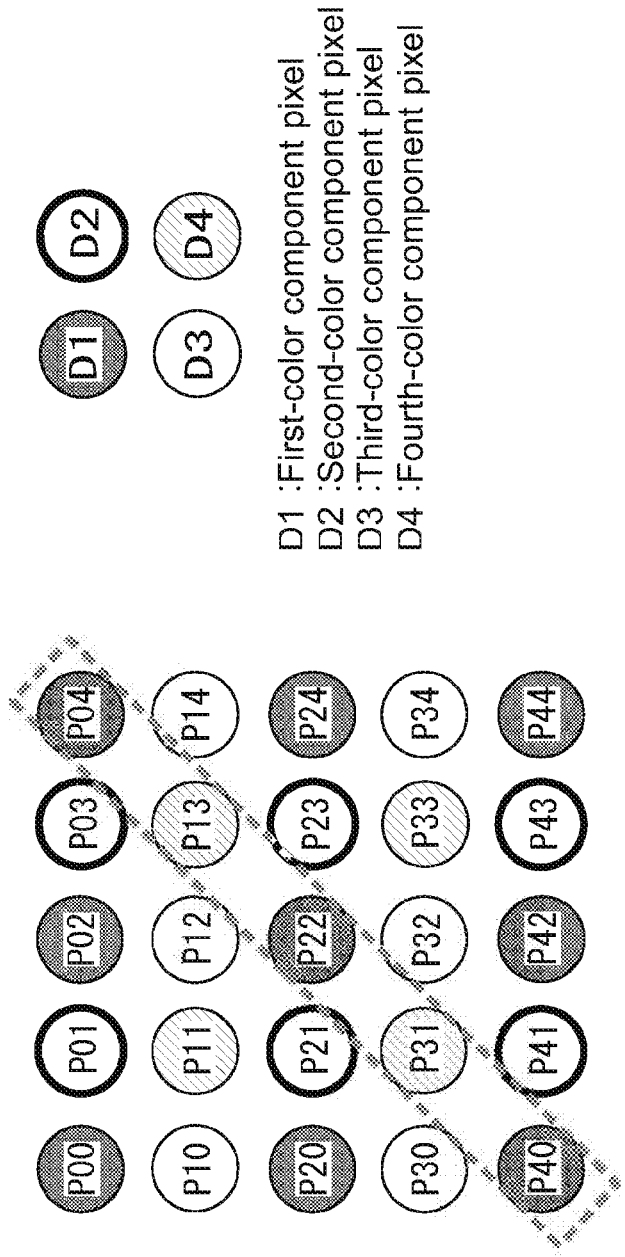
FIG. 20 is a diagram showing a matrix area of 5×5 pixels in a case when a central pixel (target pixel) is a first-color component pixel and a correlation direction is the second diagonal direction.
Figure 21:
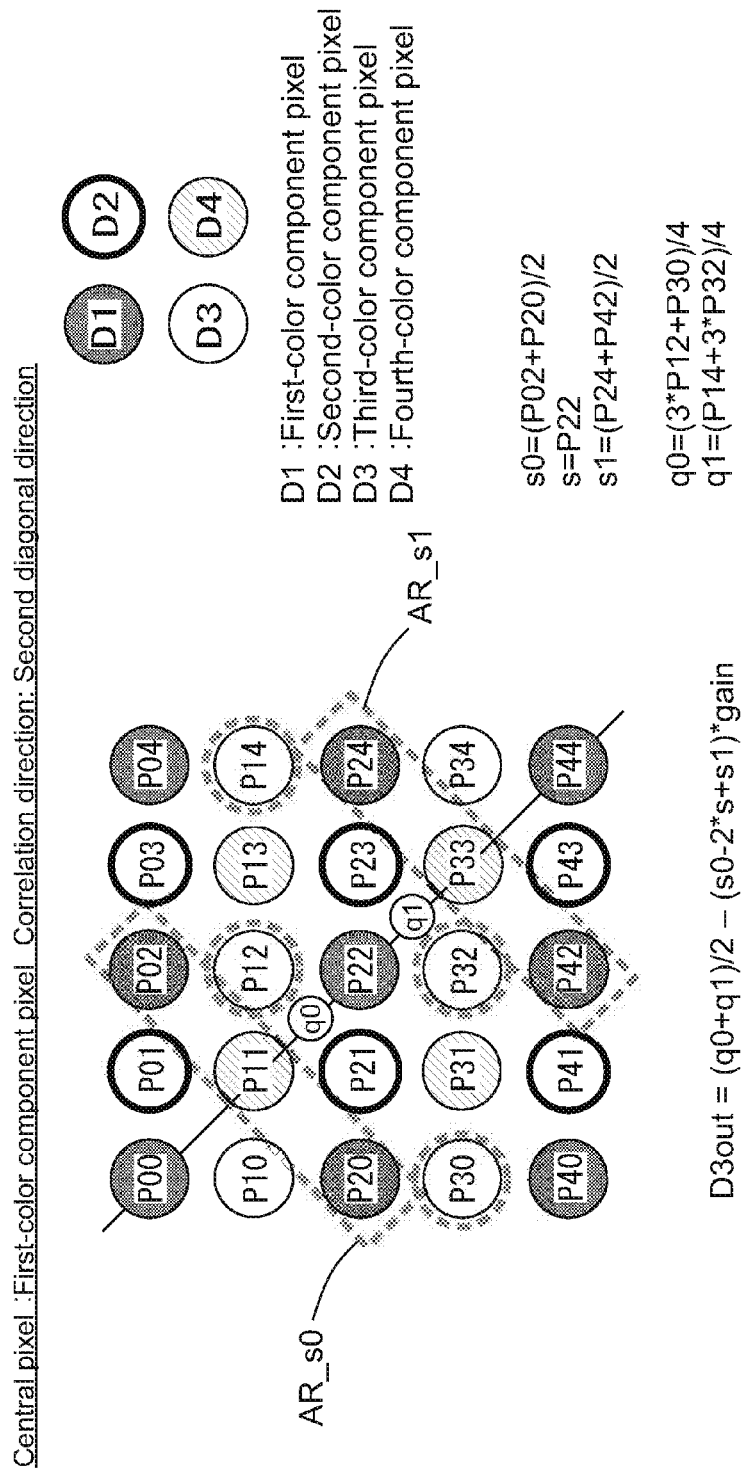
FIG. 21 is a diagram showing a matrix area of 5×5 pixels in a case when a central pixel (target pixel) is a first-color component pixel and a correlation direction is the second diagonal direction.
Figure 22:
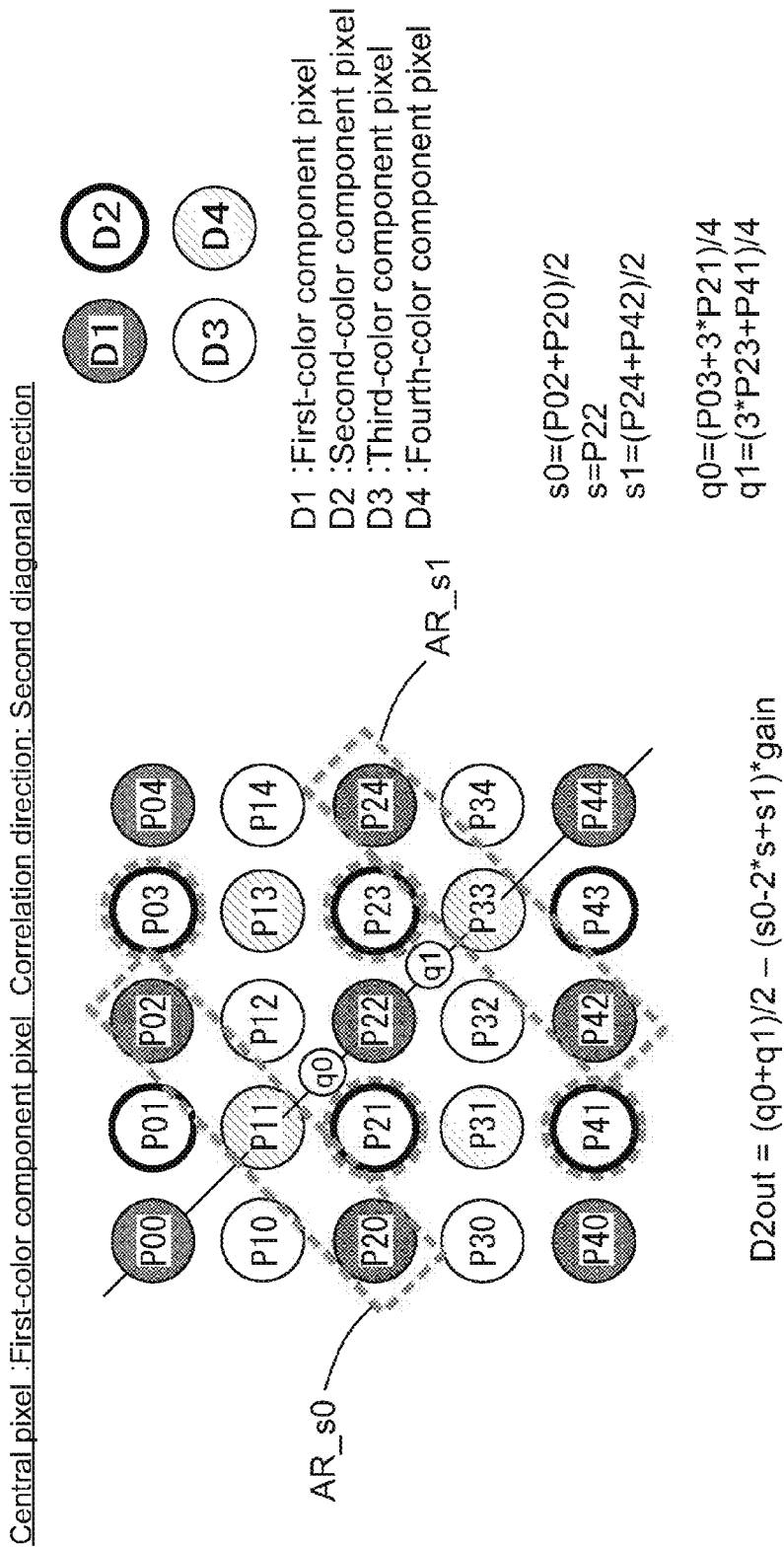
FIG. 22 is a diagram showing a matrix area of 5×5 pixels in a case when a central pixel (target pixel) is a first-color component pixel and a correlation direction is the second diagonal direction.

FIGS. 20 to 22 are diagrams describing the pixel interpolation processing in a case when the target pixel is a second-color component pixel and the correlation direction is the second diagonal direction.

When the target pixel is a first-color component pixel, the interpolation unit 3 performs processing described below to obtain the first-color component pixel value D1out, the second-color component pixel value D2out, the third-color component pixel value D3out, and the fourth-color component pixel value D4out.

D1out

The interpolation unit 3 sets the pixel value D1out of the first-color component as the pixel value P22 of the target pixel.

In other words, the interpolation unit 3 sets the value as D1out=P22.

D4out

The interpolation unit 3 performs the processing described below to obtain the pixel value D4out of the fourth-color component. The process for obtaining (calculating) the pixel value D4out of the fourth-color component will now be described with reference to FIG. 20.

FIG. 20 shows a matrix area of 5×5 pixels including a first-color component pixel as its central pixel (target pixel).

The interpolation unit 3 obtains the fourth-color component pixel value D4out of the pixel P22 using the five pixels P04, P13, P22, P31, and P40 through the processing described below.

$$D4\text{out}=(P13+P31)/2-(P04-2\times P22+P40)\times \text{gain}50$$

The term (P04−2×P22+P40) is a Laplacian component value, and gain50 is a gain for adjusting the Laplacian component value.

D3out

The interpolation unit 3 performs the processing described below to obtain the pixel value D3out of the third-color component of the pixel P22.

As shown in FIG. 21, the interpolation unit 3 obtains the first-color component value s0 of the pixel P11, the first-color component value s of the pixel P22, and the first-color component value s1 of the pixel P33 through the processing corresponding to formulas below.

$$s0=(P02+P20)/2$$

$$s=P22$$

$$s1=(P24+P42)/2$$

As shown in FIG. 21, the interpolation unit 3 obtains the third-color component q0 of the midpoint between the pixels P11 and P22 and the third-color component q1 of the midpoint between the pixels P22 and P33 through the processing (internal division processing) corresponding to the formulas below.

$$q0=(3\times P12+P30)/4$$

$$q1=(P14+3\times P32)/4$$

The interpolation unit 3 then obtains the third-color component D3out of the pixel P22 through the processing corresponding to the formula below.

$$D3\text{out}=(q0+q1)/2-(s0-2\times s+s1)\times \text{gain}51$$

The term (s0−2×s+s1) is a Laplacian component value, and gain51 is a gain for adjusting the Laplacian component value.

In this manner, the interpolation unit 3 obtains the third-color component value D3out of the pixel P22 using (1) the same color components (in the above case, the first-color component value) s0, s, and s1, which are obtained based on their high correlations in the second diagonal direction, and (2) the same color components (in the above case, third-color component value) q0 and q1, which are obtained based on their high correlations in the second diagonal direction. The interpolation unit 3 can thus obtain an interpolated pixel value with high accuracy (the third-color component value D3out of the pixel P22) using high correlations in the second diagonal direction.

D2out

As shown in FIG. 22, the interpolation unit 3 obtains the first-color component value s0 of the pixel P11, the first-color component value s of the pixel P22, and the first-color component value s1 of the pixel P33 through the processing corresponding to formulas below.

$$s0=(P02+P20)/2$$

$$s=P22$$

$$s1=(P24+P42)/2$$

As shown in FIG. 22, the interpolation unit 3 obtains the second-color component q0 of the midpoint between the pixels P11 and P22 and the second-color component q1 of the midpoint between the pixels P22 and P33 through the processing (internal division processing) corresponding to the formulas below.

$$q0=(P03+3\times P21)/4$$

$$q1=(3\times P23+P41)/4$$

The interpolation unit 3 then obtains the second-color component D2out of the pixel P22 through the processing corresponding to the formula below.

$$D2\text{out}=(q0+q1)/2-(s0-2s+s1)\times \text{gain}52$$

The term (s0−2×s+s1) is a Laplacian component value, and gain52 is a gain for adjusting the Laplacian component value.

In this manner, the interpolation unit 3 obtains the second-color component value D2out of the pixel P22 using (1) the same color components (in the above case, the first-color component value) s0, s, and s1, which are obtained based on their high correlations in the second diagonal direction, and (2) the same color components (in the above case, second-color component value) q0 and q1, which are obtained based on their high correlations in the second diagonal direction. The interpolation unit 3 can thus obtain an interpolated pixel value with high accuracy (the second-color component value D2out of the pixel P22) using high correlations in the second diagonal direction.

Note that in a case when the target pixel is a pixel other than a first-color component pixel, performing processing similar to the above-described processing achieves pixel interpolation processing with high accuracy.

Median Interpolation (Color Image Area)

When the target pixel is determined by the correlation direction determination unit 2 to have correlation in none of the directions, the interpolation unit 3 performs the pixel interpolation processing for the target pixel through the processing corresponding to the formula below. After the pixel interpolation processing, the target pixel will have the pixel value D1out for its first-color component, the pixel value D2out for its second-color component, the pixel value D3out for its third-color component, and the pixel value D4out for its fourth-color component.

A case in which the target pixel is a first-color component pixel will be described below.

When the target pixel is a first-color component pixel, the interpolation unit 3 obtains the values D1out, D2out, D3out, and D4out through the processing described below.

$$D1\text{out}=P22$$

$$D2\text{out}=\text{medium}(P21,P23,(P01+P03+P21+P23)/4,(P21+P23+P41+P43)/4)$$

$$D3\text{out}=\text{medium}(P12,P32,(P10+P30+P12+P32)/4,(P12+P32+P14+P34)/4)$$

$$D4\text{out}=\text{medium}(P11,P13,P31,P33)$$

In these formulas, medium( ) is a function that returns a median value.

The function medium( ) returns the average of the two values in the middle in numerical order when the number of elements is an even number.

For a target pixel having a color component other than a first-color component, performing processing similar to the above-described processing achieves median interpolation with high accuracy.

Average Interpolation (Color Image Area)

When the target pixel is determined by the correlation direction determination unit 2 to have high correlation in both of the vertical and horizontal directions, the interpolation unit 3 performs the pixel interpolation processing for the target pixel through the processing corresponding to the formulas below.

When the target pixel is a first-color component pixel, the interpolation unit 3 obtains the values D1out, D2out, D3out, and D4out through the processing described below.

$$D1\text{out}=P22$$

$$D2\text{out}=(P21+P23)/2$$

$$D3\text{out}=(P12+P32)/2$$

$$D4\text{out}=(P11+P13+P31+P33)/4$$

For a target pixel having a color component other than a first-color component, performing processing similar to the above-described processing achieves average interpolation for color image areas with high accuracy.

Through the above processing, the interpolation unit 3 obtains the values D1out, D2out, D3out, and D4out for each pixel. An image formed using the values D1out, D2out, D3out, and D4out (image signals having the four color component values for each pixel, or the first-color component value, the second-color component value, the third-color component value, and the fourth-color component value) is output to the interpolation unit 3.

As described above, in the imaging apparatus 1000, the pixel interpolation processing unit 100 appropriately performs pixel interpolation processing even in a case when the array pattern of a color filter (information of colors that a color filter includes) is unknown.

In other words, the pixel interpolation processing unit 100 of the imaging apparatus 1000 obtains the first-color to fourth-color component values in consideration of the fact that high-frequency components of a pixel signal in the direction (normal direction to a correlation direction) orthogonal to a direction having high correlation (correlation direction) have high correlation (are similar) regardless of colors of color filters. Thus, the pixel interpolation processing unit 100 appropriately performs pixel interpolation processing even in a case when the four-color array pattern of a color filter (the array pattern of the first-color to fourth-color) is unknown. Furthermore, the pixel interpolation processing unit 100 of the imaging apparatus 1000 obtains Laplacian components using the same color pixel in consideration of the array pattern of a color filter, and then estimates a specific color component value of a pixel located at a predetermined position using the obtained Laplacian components. Thus, the pixel interpolation processing unit 100 appropriately estimates (obtains) the specific color component value of the pixel located at the predetermined position even in a case when the array pattern of a color filter (information of colors that a color filter includes) is unknown.

In other words, the pixel interpolation processing unit 100 of the imaging apparatus 1000 uses the specific color component value of the pixel located at the predetermined position, which is obtained based on the Laplacian components. Furthermore, the pixel interpolation processing unit 100 performs pixel interpolation processing in consideration of the fact that high-frequency components of a pixel signal in the direction (normal direction to a correlation direction) orthogonal to a direction having high correlation (correlation direction) have high correlation (are similar) regardless of colors of color filters. This achieves remarkably high accurate pixel interpolation processing as compared with the conventional techniques.

The pixel interpolation processing unit 100 of the imaging apparatus 1000 does not need information of the array pattern of the color filter (information of colors that a color filter includes), thus eliminating the need for pixel interpolation processing in which different processing is performed depending on a color that the target pixel has, which conventional techniques require. Accordingly, the pixel interpolation processing unit 100 of the imaging apparatus 1000 achieves highly accurate pixel interpolation processing with less arithmetic processing.

Other Embodiments

Although the above embodiment describes the pixel interpolation processing that may use calculations with real numbers, the pixel interpolation processing may use calculations with integers. The pixel interpolation processing may include gain adjustment or clipping as needed when using limited predetermined numbers of bits or performing the processing within predetermined dynamic ranges.

All or part of the processes performed by the functional blocks described in the above embodiment may be implemented using programs.

All or part of the processes performed by the functional blocks described in the above embodiment may be implemented by a central processing unit (CPU) in a computer.

All or part of the processes performed by the functional blocks described in the above embodiment may be implemented by a central processing unit (CPU) in a computer.

The programs for these processes may be stored in a storage device, such as a hard disk or a ROM, and may be executed from the ROM or be read into a RAM and then executed.

The processes described in the above embodiment may be implemented by using either hardware or software (including use of an operating system (OS), middleware, or a predetermined library), or may be implemented using both software and hardware. When the imaging apparatus of the above embodiment is implemented by hardware, the apparatus needs timing adjustment for its processes. For ease of explanation, the timing adjustment associated with various signals used in an actual hardware design is not described in detail in the above embodiment.

The processes described in the above embodiment may not be performed in the order specified in the above embodiment. The order in which the processes are performed may be changed without departing from the scope and the spirit of the invention.

The present invention may also include a computer program enabling a computer to implement the method described in the above embodiment and a computer readable recording medium on which such a program is recorded. The computer readable recording medium may be, for example, a flexible disk, a hard disk, a CD-ROM, an MO, a DVD, a DVD-ROM, a DVD-RAM, a large-capacity DVD, a next-generation DVD, or a semiconductor memory.

The computer program may not be recorded on the recording medium but may be transmitted with an electric communication line, a wireless or wired communication line, or a network such as the Internet.

The term "unit" herein may include "circuitry," which may be partly or entirely implemented by using either hardware or software, or both hardware and software.

The specific structures of the present invention should not be limited to the above embodiment, and may be changed and modified variously without departing from the scope and the spirit of the invention.

REFERENCE SIGNS LIST

1000 imaging apparatus
C1 imaging unit
C2 signal processing unit
100 pixel interpolation processing unit (pixel interpolation processing apparatus)
1 correlation value calculation unit
2 correlation direction determination unit
3 interpolation unit

The invention claimed is:

1. A pixel interpolation processing apparatus for performing pixel interpolation processing on an image obtained by imaging circuitry having a four-color filter array in which, in an odd-numbered row, first-color component filters and second-color component filters are arranged alternately with a first-color component filter leading the row, and, in an even-numbered row, third-color component filters and fourth-color component filters are arranged alternately with a third-color component filter leading the row, the apparatus comprising:

correlation value calculation circuitry configured to use pixel data for a surrounding area around a target pixel to obtain a plurality of sets of correlation values in two directions orthogonal to each other in the image;

correlation direction determination circuitry configured to determine a correlation direction in the surrounding area around the target pixel and whether the correlation direction is a direction with a high correlation based on the correlation values obtained by the correlation value calculation circuitry; and interpolation circuitry configured to perform the pixel interpolation processing on the target pixel based on the correlation direction determined by the correlation direction determination circuitry, wherein, when the correlation direction is determined, based on the correlation values, to be a direction with a high correlation, (1) if a color component value for the same color as that of a pixel located adjacent to the target pixel in the correlation direction is to be calculated, the interpolation circuitry selects a plurality of pixels that include the target pixel, that have the same color, and are arranged in the correlation direction, and calculates a color component value for the same color as that of a pixel located adjacent to the target pixel in the correlation direction based on (i) pixel values of two pixels located adjacent to and sandwiching the target pixel in the correlation direction and (ii) a ratio of change in the correlation direction calculated using pixel values of the plurality of pixels that the interpolation circuitry has selected, (2) if a color component value for the same color as that of a pixel located adjacent to the target pixel in a normal direction which is a direction orthogonal to the correlation direction is to be calculated, the interpolation circuitry selects a plurality of pixels that have the same color and are arranged in the normal direction and calculates a color component value for the same color as that of a pixel located adjacent to the target pixel in the normal direction based on a ratio of change in the normal direction calculated using pixel values of two pixels included in the plurality of pixels that the interpolation circuitry has selected, the two pixels sandwiching the target pixel, and, (3) if a color component value for a first calculation target color which is a color component value having the same color as that of a pixel located adjacent to the target pixel in a direction inclined relative to the correlation direction is to be calculated, (3A) the interpolation circuitry selects a plurality of pixels with the same color from a first group of pixels which are a plurality of pixels including a first adjacent pixel that is one of pixels that are located adjacent to the target pixel in the normal direction and are arranged in the correlation direction, calculates a ratio of change in the normal direction from pixel values of the selected pixels, selects, from the first group of pixels, a pixel with the same color as the first calculation target color, and calculates a color component value for the first calculation target color of the first adjacent pixel based on the selected pixel and the calculated ratio of change in the normal direction, (3B) the interpolation circuitry selects a plurality of pixels with the same color from a second group of pixels which are a plurality of pixels including a second adjacent pixel that is another one of the pixels that are located adjacent to the target pixel in the normal direction and are arranged in the correlation direction, calculates a ratio of change in the normal direction from pixel values of the selected pixels, selects, from the second group of pixels, a pixel with the same color as the first calculation target color, and calculates a color component value for the first calculation target color of the second adjacent pixel based on the selected pixel and the calculated ratio of change in the normal direction, and (3C) the interpolation circuitry selects a plurality of pixels that have the same color and are arranged in the normal direction, calculates a ratio of change in the normal direction from pixel values of the selected pixels, and calculates a color component value for the first calculation target color of the target pixel based on (i) the calculated ratio of change in the normal direction, (ii) the calculated color component value for the first calculation target color of the first adjacent pixel, and (iii) the calculated color component value for the first calculation target color of the second adjacent pixel, wherein the correlation direction determination circuitry is implemented by hardware or a combination of software and the hardware.

2. The pixel interpolation processing apparatus according to claim 1, wherein:

the surrounding area around the target pixel is a pixel area of five by five pixels, in which a pixel P22 is centered, the pixel P22 representing the target pixel, the pixel area including:

a first row composed of five pixels P00 to P04;
a second row composed of five pixels P10 to P14;
a third row composed of five pixels P20 to P24;
a fourth row composed of five pixels P30 to P34; and
a fifth row composed of five pixels P40 to P44.

3. The pixel interpolation processing apparatus according to claim 2, wherein, if the correlation direction is a horizontal direction, (1) when a color component value D2out for the same color as that of a pixel located adjacent to the target pixel in the correlation direction is to be calculated, the interpolation circuitry calculates the color component value D2out by a process represented by:

$$D2out=(P21+P23)/2-(P20-2\times P22+P24)\times \text{gain0},$$

where gain0 is a coefficient for adjustment,
where Pxy is a pixel value of the pixel Pxy, (2) when a color component value D3out for the same color as that of a pixel located adjacent to the target pixel in a normal direction which is a direction orthogonal to the correlation direction is to be calculated, the interpolation circuitry calculates the color component value D3out by a process represented by:

$$q0=(P11+P31)/2-(P01-2\times P21+P41)\times \text{gain1},$$

$$q1=(P13+P33)/2-(P03-2\times P23+P43)\times \text{gain2},$$

$$d0a=P11-q0,$$

$$d0b=P13-q1,$$

$$d0=(d0a+d0b)/2,$$

$$d1a=P31-q0,$$

$$d1b=P33-q1,$$

$$d1=(d1a+d1b)/2, \text{ and}$$

$$D3out=(P12+P32)/2-(d0+d1)\times \text{gain3},$$

where gain1, gain2 and gain3 are coefficients for adjustment,
where Pxy is a pixel value of the pixel Pxy, and (3) when a color component value D4out of the first calculation target color which is a color component value for the same color as that of a pixel located adjacent to the target pixel in a direction inclined relative to the correlation direction is to be calculated, the interpolation circuitry calculates the color component value D4out by a process represented by:

$q0=(P11+P31)/2-(P01-2\times P21+P41)\times \text{gain1}$, $q1=(P13+P33)/2-(P03-2\times P23+P43)\times \text{gain2}$, $d0a=P11-q0$, $d0b=P13-q1$, $d0=(d0a+d0b)/2$, $d1a=P31-q0$, $d1b=P33-q1$, $d1=(d1a+d1b)/2$, $r0=(P11+P13)/2-(P10-2\times P12+P14)\times \text{gain4}$, $r1=(P31+P33)/2-(P30-2\times P32+P34)\times \text{gain5}$, and $D4\text{out}=(r0+r1)/2-(d0+d1)\times \text{gain6}$, where gain1, gain2 and gain3 are coefficients for adjustment,
where gain4, gain5 and gain6 are coefficients for adjustment.

4. The pixel interpolation processing apparatus according to claim 2, wherein,
if the correlation direction is a vertical direction,
(1) when a color component value D3out for the same color as that of a pixel located adjacent to the target pixel in the correlation direction is to be calculated, the interpolation circuitry calculates the color component value D3out by a process represented by:

$t0=(P12+P32)/2$, $t1=(P02-2\times P22+P42)\times \text{gain10}$, and $D3\text{out}=t0-t1$, where gain10 is a coefficient for adjustment,
where Pxy is a pixel value of the pixel Pxy,
(2) when a color component value D2out for the same color as that of a pixel located adjacent to the target pixel in a normal direction which is a direction orthogonal to the correlation direction is to be calculated, the interpolation circuitry calculates the color component value D2out by a process represented by:

$q0=(P11+P13)/2-(P10-2\times P12+P14)\times \text{gain11}$, $q1=(P31+P33)/2-(P30-2\times P32+P34)\times \text{gain12}$, $d0a=P11-q0$, $d0b=P31-q1$, $d0=(d0a+d0b)/2$, $d1a=P13-q0$, $d1b=P33-q1$, $d1=(d1a+d1b)/2$, and $D2\text{out}=(P21+P23)/2-(d0+d1)\times \text{gain13}$ where gain11, gain12 and gain13 are coefficients for adjustment,
where Pxy is a pixel value of the pixel Pxy,
(3) when a color component value D4out for the first calculation target color which is a color component value for the same color as that of a pixel located adjacent to the target pixel in a direction inclined relative to the correlation direction is to be calculated, the interpolation circuitry calculates the color component value D4out by a process represented by:

$q0=(P11+P13)/2-(P10-2\times P12+P14)\times \text{gain11}$, $q1=(P31+P33)/2-(P30-2\times P32+P34)\times \text{gain12}$, $d0a=P11-q0$, $d0b=P31-q1$, $d0=(d0a+d0b)/2$, $d1a=P13-q0$, $d1b=P33-q1$, $d1=(d1a+d1b)/2$, $r0=(P11+P31)/2-(P01-2\times P21+P41)\times \text{gain14}$, $r1=(P13+P33)/2-(P03-2\times P23+P43)\times \text{gain15}$, and $D4\text{out}=(r0+r1)/2-(d0+d1)\times \text{gain16}$, where gain11, gain12, gain14 and gain15 are coefficients for adjustment.

5. The pixel interpolation processing apparatus according to claim 2, wherein,
if the correlation direction is a first diagonal direction that is a left obliquely upward direction,
(1) when a color component value D4out for the same color as that of a pixel located adjacent to the target pixel in the correlation direction is to be calculated, the interpolation circuitry calculates the color component value D4out by a process represented by:

$D4\text{out}=(P11+P33)/2-(P00-2\times P22+P44)\times \text{gain40}$, where gain40 is a coefficient for adjustment,
where Pxy is a pixel value of the pixel Pxy,
(2) when a color component value D3out for the same color as that of a pixel located adjacent to the target pixel in a vertical direction is to be calculated, the interpolation circuitry calculates the color component value D3out by a process represented by:

$s0=(P02+P24)/2$, $s=P22$, $s1=(P20+P42)/2$, $q0=(3\times P12+P34)/4$, $q1=(P10+3\times P32)/4$, and $D3\text{out}=(q0+q1)/2-(s0-2\times s+s1)\times \text{gain41}$, where gain41 is a coefficient for adjustment,
where Pxy is a pixel value of the pixel Pxy, (3) when a color component value D2out for the same color as that of a pixel located adjacent to the target pixel in a horizontal direction is to be calculated, the interpolation circuitry calculates the color component value D2out by a process represented by:

$s0=(P02+P24)/2,$ $s=P22,$ $s1=(P20+P42)/2,$ $q0=(P01+3\times P23)/4,$ $q1=(3\times P21+P43)/4,$ and $D2out=(q0+q1)/2-(s0-2\times s+s1)\times gain42,$ where gain42 is a coefficient for adjustment.

6. The pixel interpolation processing apparatus according to claim 2, wherein,
if the correlation direction is a second diagonal direction that is a right obliquely upward direction,
(1) when a color component value D4out for the same color as that of a pixel located adjacent to the target pixel in the correlation direction is to be calculated, the interpolation circuitry calculates the color component value D4out by a process represented by:

$D4out=(P13+P31)/2-(P04-2\times P22+P40)\times gain50,$ where gain50 is a coefficient for adjustment,
where Pxy is a pixel value of the pixel Pxy,
(2) when a color component value D3out for the same color as that of a pixel located adjacent to the target pixel in a vertical direction is to be calculated, the interpolation circuitry calculates the color component value D3out by a process represented by:

$s0=(P02+P20)/2,$ $s=P22,$ $s1=(P24+P42)/2,$ $q0=(3\times P12+P30)/4,$ $q1=(P14+3\times P32)/4,$ and $D3out=(q0+q1)/2-(s0-2\times s+s1)\times gain51,$ where gain 51 is a coefficient for adjustment,
where Pxy is a pixel value of the pixel Pxy,
(3) when a color component value D2out for the same color as that of a pixel located adjacent to the target pixel in a horizontal direction is to be calculated, the interpolation circuitry calculates the color component value D2out by a process represented by:

$s0=(P02+P20)/2,$ $s=P22,$ $s1=(P24+P42)/2,$ $q0=(P03+3\times P21)/4,$ $q1=(3\times P23+P41)/4,$ and $D2out=(q0+q1)/2-(s0-2\times s+s1)\times gain52,$ where gain52 is a coefficient for adjustment.

7. An image capturing apparatus comprising:
imaging circuitry having a four-color filter array in which, in an odd-numbered row, first color component filters and second color component filters are arranged alternately with a first color component filter leading the row, and, in an even-numbered row, third color component filters and fourth color component filters are arranged alternately with a third color component filter leading the row, the imaging circuitry configured to obtain an image signal from light from a subject; and
the pixel interpolation processing apparatus according to claim 1, the pixel interpolation processing apparatus configured to perform the pixel interpolation processing on the image signal.

8. An image capturing apparatus comprising:
imaging circuitry having a four-color filter array in which, in an odd-numbered row, first color component filters and second color component filters are arranged alternately with a first color component filter leading the row, and, in an even-numbered row, third color component filters and fourth color component filters are arranged alternately with a third color component filter leading the row, the imaging circuitry configured to obtain an image signal from light from a subject; and
the pixel interpolation processing apparatus according to claim 2, the pixel interpolation processing apparatus configured to perform the pixel interpolation processing on the image signal.

9. An image capturing apparatus comprising:
imaging circuitry having a four-color filter array in which, in an odd-numbered row, first color component filters and second color component filters are arranged alternately with a first color component filter leading the row, and, in an even-numbered row, third color component filters and fourth color component filters are arranged alternately with a third color component filter leading the row, the imaging circuitry configured to obtain an image signal from light from a subject; and
the pixel interpolation processing apparatus according to claim 3, the pixel interpolation processing apparatus configured to perform the pixel interpolation processing on the image signal.

10. An image capturing apparatus comprising:
imaging circuitry having a four-color filter array in which, in an odd-numbered row, first color component filters and second color component filters are arranged alternately with a first color component filter leading the row, and, in an even-numbered row, third color component filters and fourth color component filters are arranged alternately with a third color component filter leading the row, the imaging circuitry configured to obtain an image signal from light from a subject; and
the pixel interpolation processing apparatus according to claim 4, the pixel interpolation processing apparatus configured to perform the pixel interpolation processing on the image signal.

11. An image capturing apparatus comprising:
imaging circuitry having a four-color filter array in which, in an odd-numbered row, first color component filters and second color component filters are arranged alternately with a first color component filter leading the row, and, in an even-numbered row, third color component filters and fourth color component filters are arranged alternately with a third color component filter leading the row, the imaging circuitry configured to obtain an image signal from light from a subject; and the pixel interpolation processing apparatus according to claim 5, the pixel interpolation processing apparatus configured to perform the pixel interpolation processing on the image signal.

12. An image capturing apparatus comprising:

imaging circuitry having a four-color filter array in which, in an odd-numbered row, first color component filters and second color component filters are arranged alternately with a first color component filter leading the row, and, in an even-numbered row, third color component filters and fourth color component filters are arranged alternately with a third color component filter leading the row, the imaging circuitry configured to obtain an image signal from light from a subject; and the pixel interpolation processing apparatus according to claim 6, the pixel interpolation processing apparatus configured to perform the pixel interpolation processing on the image signal.

13. A pixel interpolation processing method for performing pixel interpolation processing on an image obtained by imaging circuitry having a four-color filter array in which, in an odd-numbered row, first-color component filters and second-color component filters are arranged alternately with a first-color component filter leading the row, and, in an even-numbered row, third-color component filters and fourth-color component filters are arranged alternately with a third-color component filter leading the row, the method comprising:

(a) using pixel data for a surrounding area around a target pixel to obtain a plurality of sets of correlation values in two directions orthogonal to each other in the image;

(b) determining a correlation direction in the surrounding area around the target pixel and whether the correlation direction is a direction with a high correlation based on the correlation values obtained by the step (a); and (c) performing the pixel interpolation processing on the target pixel based on the correlation direction determined by the step (b), wherein, when the correlation direction is determined, based on the correlation values, to be a direction with a high correlation, (1) if a color component value for the same color as that of a pixel located adjacent to the target pixel in the correlation direction is to be calculated, the step (c) selects a plurality of pixels that include the target pixel, that have the same color, and are arranged in the correlation direction, and calculates a color component value for the same color as that of a pixel located adjacent to the target pixel in the correlation direction based on (i) pixel values of two pixels located adjacent to and sandwiching the target pixel in the correlation direction and (ii) a ratio of change in the correlation direction calculated using pixel values of the plurality of pixels that the step (c) has selected, (2) if a color component value for the same color as that of a pixel located adjacent to the target pixel in a normal direction which is a direction orthogonal to the correlation direction is to be calculated, the step (c) selects a plurality of pixels that have the same color and are arranged in the normal direction and calculates a color component value for the same color as that of a pixel located adjacent to the target pixel in the normal direction based on a ratio of change in the normal direction calculated using pixel values of two pixels included in the plurality of pixels that the step (c) has selected, the two pixels sandwiching the target pixel, and, (3) if a color component value for a first calculation target color which is a color component value having the same color as that of a pixel located adjacent to the target pixel in a direction inclined relative to the correlation direction is to be calculated, (3A) the step (c) selects a plurality of pixels with the same color from a first group of pixels which are a plurality of pixels including a first adjacent pixel that is one of pixels that are located adjacent to the target pixel in the normal direction and are arranged in the correlation direction, calculates a ratio of change in the normal direction from pixel values of the selected pixels, selects, from the first group of pixels, a pixel with the same color as the first calculation target color, and calculates a color component value for the first calculation target color of the first adjacent pixel based on the selected pixel and the calculated ratio of change in the normal direction, (3B) the step (c) selects a plurality of pixels with the same color from a second group of pixels which are a plurality of pixels including a second adjacent pixel that is another one of the pixels that are located adjacent to the target pixel in the normal direction and are arranged in the correlation direction, calculates a ratio of change in the normal direction from pixel values of the selected pixels, selects, from the second group of pixels, a pixel with the same color as the first calculation target color, and calculates a color component value for the first calculation target color of the second adjacent pixel based on the selected pixel and the calculated ratio of change in the normal direction, and (3C) the step (c) selects a plurality of pixels that have the same color and are arranged in the normal direction, calculates a ratio of change in the normal direction from pixel values of the selected pixels, and calculates a color component value for the first calculation target color of the target pixel based on (i) the calculated ratio of change in the normal direction, (ii) the calculated color component value for the first calculation target color of the first adjacent pixel, and (iii) the calculated color component value for the first calculation target color of the second adjacent pixel.

14. An integrated circuit for performing pixel interpolation processing on an image obtained by imaging circuitry having a four-color filter array in which, in an odd-numbered row, first-color component filters and second-color component filters are arranged alternately with a first-color component filter leading the row, and, in an even-numbered row, third-color component filters and fourth-color component filters are arranged alternately with a third-color component filter leading the row, the integrated circuit comprising:

correlation value calculation circuitry configured to use pixel data for a surrounding area around a target pixel to obtain a plurality of sets of correlation values in two directions orthogonal to each other in the image;

correlation direction determination circuitry configured to determine a correlation direction in the surrounding area around the target pixel and whether the correlation direction is a direction with a high correlation based on the correlation values obtained by the correlation value calculation circuitry; and interpolation circuitry configured to perform the pixel interpolation processing on the target pixel based on the correlation direction determined by the correlation direction determination circuitry, wherein, when the correlation direction is determined, based on the correlation values, to be a direction with a high correlation, (1) if a color component value for the same color as that of a pixel located adjacent to the target pixel in the correlation direction is to be calculated, the interpolation circuitry selects a plurality of pixels that include the target pixel, that have the same color, and are arranged in the correlation direction, and calculates a color component value for the same color as that of a pixel located adjacent to the target pixel in the correlation direction based on (i) pixel values of two pixels located adjacent to and sandwiching the target pixel in the correlation direction and (ii) a ratio of change in the correlation direction calculated using pixel values of the plurality of pixels that the interpolation circuitry has selected, (2) if a color component value for the same color as that of a pixel located adjacent to the target pixel in a normal direction which is a direction orthogonal to the correlation direction is to be calculated, the interpolation circuitry selects a plurality of pixels that have the same color and are arranged in the normal direction and calculates a color component value for the same color as that of a pixel located adjacent to the target pixel in the normal direction based on a ratio of change in the normal direction calculated using pixel values of two pixels included in the plurality of pixels that the interpolation circuitry has selected, the two pixels sandwiching the target pixel, and, (3) if a color component value for a first calculation target color which is a color component value having the same color as that of a pixel located adjacent to the target pixel in a direction inclined relative to the correlation direction is to be calculated, (3A) the interpolation circuitry selects a plurality of pixels with the same color from a first group of pixels which are a plurality of pixels including a first adjacent pixel that is one of pixels that are located adjacent to the target pixel in the normal direction and are arranged in the correlation direction, calculates a ratio of change in the normal direction from pixel values of the selected pixels, selects, from the first group of pixels, a pixel with the same color as the first calculation target color, and calculates a color component value for the first calculation target color of the first adjacent pixel based on the selected pixel and the calculated ratio of change in the normal direction, (3B) the interpolation circuitry selects a plurality of pixels with the same color from a second group of pixels which are a plurality of pixels including a second adjacent pixel that is another one of the pixels that are located adjacent to the target pixel in the normal direction and are arranged in the correlation direction, calculates a ratio of change in the normal direction from pixel values of the selected pixels, selects, from the second group of pixels, a pixel with the same color as the first calculation target color, and calculates a color component value for the first calculation target color of the second adjacent pixel based on the selected pixel and the calculated ratio of change in the normal direction, and (3C) the interpolation circuitry selects a plurality of pixels that have the same color and are arranged in the normal direction, calculates a ratio of change in the normal direction from pixel values of the selected pixels, and calculates a color component value for the first calculation target color of the target pixel based on (i) the calculated ratio of change in the normal direction, (ii) the calculated color component value for the first calculation target color of the first adjacent pixel, and (iii) the calculated color component value for the first calculation target color of the second adjacent pixel.

* * * * *